(12) United States Patent
Wang et al.

(10) Patent No.: US 12,120,731 B2
(45) Date of Patent: Oct. 15, 2024

(54) RANDOM ACCESS METHOD AND APPARATUS, AND DEVICE

(71) Applicant: HUAWEI TECHNOLOGIES CO., LTD., Guangdong (CN)

(72) Inventors: Xiaolu Wang, Hangzhou (CN); Hejia Luo, Hangzhou (CN); Rong Li, Hangzhou (CN); Bin Wang, Hangzhou (CN); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 373 days.

(21) Appl. No.: 17/735,601

(22) Filed: May 3, 2022

(65) Prior Publication Data
US 2022/0264636 A1    Aug. 18, 2022

Related U.S. Application Data

(63) Continuation of application No. PCT/CN2020/123720, filed on Oct. 26, 2020.

(30) Foreign Application Priority Data

Nov. 5, 2019 (CN) .......................... 201911072961.2

(51) Int. Cl.
*H04W 74/00* (2009.01)
*H04B 7/19* (2006.01)
*H04W 74/0833* (2024.01)

(52) U.S. Cl.
CPC ....... *H04W 74/004* (2013.01); *H04W 74/008* (2013.01); *H04W 74/0833* (2013.01); *H04B 7/19* (2013.01)

(58) Field of Classification Search
None
See application file for complete search history.

(56) References Cited

U.S. PATENT DOCUMENTS

2017/0265230 A1*  9/2017  Liu ................... H04W 74/0841
2021/0345280 A1* 11/2021  Zhang ............... H04W 56/0045

FOREIGN PATENT DOCUMENTS

| CN | 105517182 A | 4/2016 |
|----|-------------|--------|
| CN | 109587819 A | 4/2019 |

(Continued)

OTHER PUBLICATIONS

Panasonic, "Timing Advance and PRACH Design for NTN," 3GPP TSG RAN WG1 #99, R1-1912903, Reno, USA, Nov. 18-22, 2019, 13 pages.

(Continued)

*Primary Examiner* — Hong S Cho
(74) *Attorney, Agent, or Firm* — Fish & Richardson P.C.

(57) ABSTRACT

Example random access methods and apparatus are described. In one example, the network device obtains a first random access preamble length of a first terminal device and a second random access preamble length of a second terminal device. The network device determines a first random access parameter of the first terminal device and a second random access parameter of the second terminal device based on the first random access preamble length and the second random access preamble length. The network device sends the first random access parameter and the second random access parameter to the first terminal device and the second terminal device respectively.

15 Claims, 13 Drawing Sheets

(56) References Cited

FOREIGN PATENT DOCUMENTS

| IN | 110213834 A | 9/2019 |
|---|---|---|
| WO | 2015190959 A1 | 12/2015 |
| WO | 2018084208 A1 | 5/2018 |
| WO | 2019069240 A1 | 4/2019 |
| WO | 2019195457 A1 | 10/2019 |

OTHER PUBLICATIONS

Zte et al., "Report of Email Discussion [106#70] [NR/NTN] RACH Capacity/Procedures," 3GPP TSG-RAN WG2 Meeting #107, R2-1909256, Prague, Czech, Aug. 26-30, 2019, 38 pages.

CATT, "PRACH Design and UL Timing Advance," 3GPP TSG RAN WG1 Meeting #97, R1-1906325, Reno, USA, May 13-17, 2019, 7 pages.

Office Action in Chinese Appln. No. 201911072961.2, dated Feb. 11, 2022, 6 pages (with English translation).

Extended European Search Report in European Appln No. 20885026.3, dated Oct. 18, 2022, 6 pages.

International Search Report and Written Opinion in International Appln. No. PCT/CN2020/123720, mailed on Jan. 27, 2021, 15 pages (with English translation).

\* cited by examiner

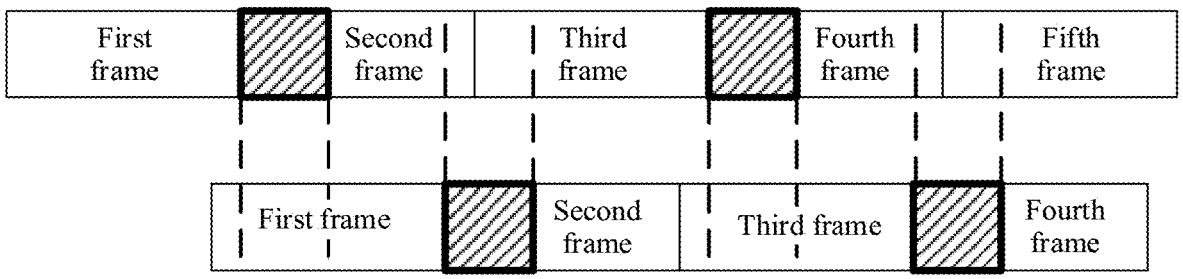
 Random access preamble
FIG. 4
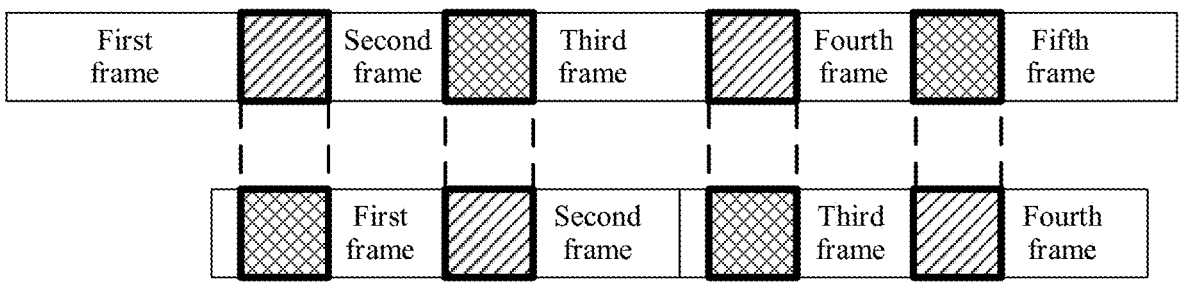
 Random access preamble
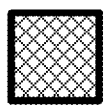 Resource is not allocated
FIG. 5

Downlink data

| First frame | Second frame | Third frame | Fourth frame | Fifth frame |

Uplink data of a terminal device
with a positioning function

| First frame | | Second frame | | Third frame | | Fourth frame | | Fifth frame |

| | First frame | | Second frame | | Third frame | | Fourth frame |

Uplink data of a terminal device
without a positioning function

⇩

Downlink data

| First frame | Second frame | Third frame | Fourth frame | Fifth frame |

Uplink data of the terminal device
with the positioning function

| First frame | Second frame  | Third frame | Fourth frame | Fifth frame |

| First Frame | Second frame | Third frame | Fourth frame |

Uplink data of the terminal device
without the positioning function

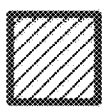 Random access preamble

 Resource is not allocated

FIG. 9

RANDOM ACCESS METHOD AND APPARATUS, AND DEVICE

CROSS-REFERENCE TO RELATED APPLICATIONS

This application is a continuation of International Application No. PCT/CN2020/123720, filed on Oct. 26, 2020, which claims priority to Chinese Patent Application No. 201911072961.2, filed on Nov. 5, 2019. The disclosures of the aforementioned applications are hereby incorporated by reference in their entireties.

TECHNICAL FIELD

This application relates to the field of communication technologies, and in particular, to a random access method and apparatus, and a device.

BACKGROUND

During non-terrestrial communication, a round-trip delay generated when a user terminal communicates with a satellite is large, which affects a random access process of the user terminal.

When initiating a random access request, a user terminal with a positioning function calculates, based on location information of the user terminal and location information of a satellite, a timing advance that needs to be used. However, a user terminal without a positioning function can use only a common timing advance or a partial common timing advance broadcast on a network side. When the partial common timing advance (Partial Common Timing Advance) is broadcast on the network side, the network side needs to perform delay compensation on an uplink signal of the terminal without the positioning function. At the same time, the user terminal with the positioning function can obtain, through calculation, the complete timing advance that is needed, and the network side does not need to perform delay compensation on an uplink signal of the user terminal. Therefore, when the user terminal with the positioning function and the user terminal without the positioning function send random access preambles on a same random access occasion, a time difference occurs when the random access preambles of the two user terminals arrive at the satellite. Consequently, interference occurs between uplink data of the user terminal that applies for access and uplink data of the user terminal that has accessed a network. To avoid mutual interference between the foregoing uplink data, a solution that may be adopted is that a time-frequency resource that is in one type of user terminal and that corresponds to a random access preamble of another type of user terminal is not allocated to another user terminal that has accessed the network. In this solution, when the user terminal sends the random access preamble, twice a time-frequency resource needs to be occupied. This causes large resource waste.

SUMMARY

This application provides a random access method and apparatus, and a device, to resolve a problem of large time-frequency resource waste in an existing solution.

According to a first aspect, this application provides a random access method, including:

The network device obtains a first random access preamble length and a second random access preamble length, where the first random access preamble length is duration of a first random access preamble sent by a first terminal device, the second random access preamble length is duration of a second random access preamble sent by a second terminal device, and a value of delay compensation performed by the network device when receiving the first random access preamble is different from a value of delay compensation performed by the network device when receiving the second random access preamble.

The network device determines a first random access parameter of the first terminal device and a second random access parameter of the second terminal device based on the first random access preamble length and the second random access preamble length, where there is an overlapping part, in time domain, between a random access preamble indicated by the first random access parameter and a random access preamble indicated by the second random access parameter.

The network device sends the first random access parameter to the first terminal device, and sends the second random access parameter to the second terminal device.

In the foregoing process, the network device determines the first random access parameter of the first terminal device and the second random access parameter of the second terminal device based on the first random access preamble length and the second random access preamble length, so that there is the overlapping part between the random access preamble indicated by the first random access parameter and the random access preamble indicated by the second random access parameter. Therefore, when the first terminal device performs random access based on the first random access parameter, and the second terminal device performs random access based on the second random access parameter, the first random access preamble can overlap with the second random access preamble. This reduces a range of a time-frequency resource occupied by a random access preamble, and reduces time-frequency resource waste.

In a possible implementation, the first random access parameter includes at least one of the following parameters:

first duration of an interval between a start location of the first random access preamble and a start location of a first time unit in which the first random access preamble is located, and a first period of the first random access preamble.

The second random access parameter includes at least one of the following parameters:

second duration of an interval between a start location of the second random access preamble and a start location of a second time unit in which the second random access preamble is located, and a second period of the second random access preamble.

In the foregoing process, it is determined that the first random access parameter includes at least one of the first duration and the first period, and the second random access parameter includes at least one of the second duration and the second period. The first terminal device may determine a location of the first random access preamble in uplink data based on the first duration, and may determine duration of an interval between adjacent first random access preambles based on the first period. The second terminal device may determine a location of the second random access preamble in uplink data based on the second duration, and may determine duration of an interval between adjacent second random access preambles based on the second period. After the network device sends the first random access parameter to the first terminal device and sends the second random access parameter to the second terminal device, the first terminal device and the second terminal device may separately perform random access based on respective random access parameters, so that the first random access preamble at least partially overlaps with the second random access preamble. This reduces time-frequency resource waste.

In a possible implementation, an absolute value of a difference between the first duration and third duration is less than or equal to an absolute value of a difference between the first random access preamble length and the second random access preamble length, and the third duration is duration of an interval between the start location of the second random access preamble received by the network device and the start location of the first time unit in which the first random access preamble is located.

In the foregoing process, an overlapping area between the first random access preamble of the first terminal device and the second random access preamble of the second terminal device can be maximized by setting a first-type restriction condition, that is, the absolute value of the difference between the first duration and the third duration is less than or equal to the absolute value of the difference between the first random access preamble length and the second random access preamble length.

In a possible implementation, duration of the second period is M times duration of the first period, and M is a positive integer.

Alternatively, duration of the first period is N times duration of the second period, and N is a positive integer.

In the foregoing process, a quantity of overlapping resources between the first random access preamble of the first terminal device and the second random access preamble of the second terminal device can be maximized by setting a second-type restriction condition, that is, the first period is an integer multiple of the second period, or the second period is an integer multiple of the first period.

In a possible implementation, a reference common timing is an integer multiple of a third time unit, and the reference common timing is a value of delay compensation performed by the network device on the second terminal device for sending the second random access preamble.

In the foregoing process, the uplink data of the second terminal device can be aligned, on a network device side, with a timing boundary of downlink data by setting a third-type restriction condition, that is, the reference common timing is an integer multiple of slot duration, an integer multiple of subframe duration, or an integer multiple of frame duration.

In a possible implementation, the first random access preamble includes a plurality of adjacent random access preambles. In this case, the plurality of adjacent random access preambles are processed as one first random access preamble.

In a possible implementation, the second random access preamble includes a plurality of adjacent random access preambles. In this case, the plurality of adjacent random access preambles are processed as one second random access preamble.

According to a second aspect, this application provides a random access apparatus, including:

an obtaining module, configured to obtain a first random access preamble length and a second random access preamble length, where the first random access preamble length is duration of a first random access preamble sent by a first terminal device, the second random access preamble length is duration of a second random access preamble sent by a second terminal device, and a value of delay compensation performed by a network device when receiving the first random access preamble is different from a value of delay compensation performed by the network device when receiving the second random access preamble;

a processing module, configured to determine a first random access parameter of the first terminal device and a second random access parameter of the second terminal device based on the first random access preamble length and the second random access preamble length, where there is an overlapping part, in time domain, between a random access preamble indicated by the first random access parameter and a random access preamble indicated by the second random access parameter; and a sending module, configured to send the first random access parameter to the first terminal device, and send the second random access parameter to the second terminal device.

In a possible implementation, the first random access parameter includes at least one of the following parameters:

first duration of an interval between a start location of the first random access preamble and a start location of a first time unit in which the first random access preamble is located, and a first period of the first random access preamble.

The second random access parameter includes at least one of the following parameters:

second duration of an interval between a start location of the second random access preamble and a start location of a second time unit in which the second random access preamble is located, and a second period of the second random access preamble.

In a possible implementation, an absolute value of a difference between the first duration and third duration is less than or equal to an absolute value of a difference between the first random access preamble length and the second random access preamble length, and the third duration is duration of an interval between the start location of the second random access preamble received by the network device and the start location of the first time unit in which the first random access preamble is located.

In a possible implementation, duration of the second period is M times duration of the first period, and M is a positive integer.

Alternatively, duration of the first period is N times duration of the second period, and N is a positive integer.

In a possible implementation, a reference common timing is an integer multiple of a third time unit, and the reference common timing is a value of delay compensation performed by the network device on the second terminal device for sending the second random access preamble.

According to a third aspect, this application provides a network device, including a memory, a processor, and a computer program, where the computer program is stored in the memory, and the processor runs the computer program to perform the random access method in any one of the first aspect.

According to a fourth aspect, this application provides a storage medium, where the storage medium includes a computer program, and the computer program is used to implement the random access method in any one of the first aspect.

According to a fifth aspect, this application provides a computer program product, where the computer program product includes computer program code, and when the computer program code is run on a computer, the computer is enabled to perform the random access method in any one of the first aspect.

According to a sixth aspect, this application provides a chip, including a memory and a processor, where the memory is configured to store a computer program, and the processor is configured to invoke the computer program from the memory and run the computer program, so that a communication device on which the chip is installed performs the random access method in any one of the first aspect.

According to a seventh aspect, this application provides a random access system, where the random access system includes a first terminal device, a second terminal device, and a network device, the first terminal device and the second terminal device are two terminal devices whose values of delay compensation performed by the network device when receiving random access preambles are different, and the network device is the network device in any one of the possible implementations of the second aspect.

According to the random access method and apparatus, and the device provided in this application, the network device first determines, based on a relative location between beam coverage or a cell and a satellite, the first random access preamble length used by the first terminal device and the second random access preamble length used by the second terminal device; then determines the first random access parameter of the first terminal device and the second random access parameter of the second terminal device based on the first random access preamble length and the second random access preamble length; and finally sends the first random access parameter to the first terminal device and sends the second random access parameter to the second terminal device. Therefore, the first terminal device performs random access based on the first random access parameter, and the second terminal device performs random access based on the second random access parameter. Because there is the overlapping part, in time domain, between the random access preamble indicated by the first random access parameter and the random access preamble indicated by the second random access parameter, a time-frequency resource occupied by the random access preamble can be reduced, and time-frequency resource waste is reduced.

BRIEF DESCRIPTION OF DRAWINGS

FIG. 4 is a schematic diagram of an access preamble arrival window of a terminal device according to this application;

FIG. 5 is a schematic diagram of terminal device resource allocation according to this application;

FIG. 9 is a schematic diagram 2 of a random access preamble sent by a terminal device according to this application;

DESCRIPTION OF EMBODIMENTS

Figure 1:
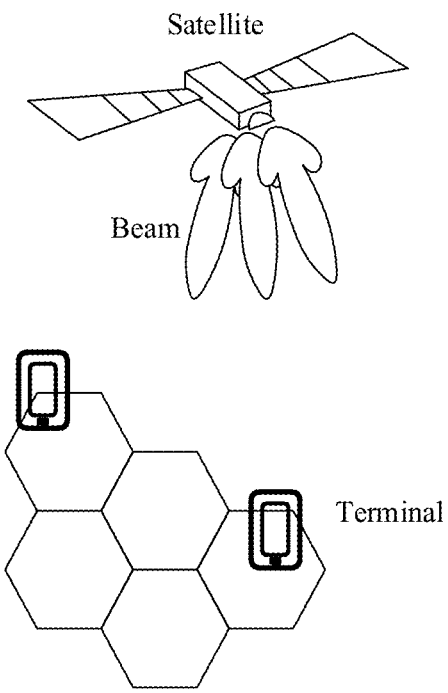
FIG. 1 is a diagram of an architecture of a satellite communication system according to this application.

The following first describes concepts that are used in this application.

3GPP means a 3rd generation partnership, namely, a 3rd generation partnership project.

GEO means a geostationary orbit. The geosynchronous orbit is a prograde artificial earth satellite orbit with a revolution period equal to a period of rotation of the Earth (23 hours, 56 minutes, and 4 seconds). A distance between an artificial satellite in the geostationary orbit and the Earth is about 35786 km, a revolution direction of the satellite is the same as a direction of rotation of the Earth, and an orbiting speed of the satellite is 3.07 km/s, and is the same as an angular velocity of rotation of the Earth. Three communication satellites are deployed in the geosynchronous orbit. This can achieve global communication on the Earth except the two poles.

A random access process is a process before a terminal device transmits a random access preamble to establish a basic signaling connection to a network device, and is a process in which the terminal device establishes a radio link with the network device, to obtain or restore uplink synchronization. Random access is a key step in a mobile communication system, through which the terminal device can establish a communication connection to the network device. The terminal device exchanges information with the network device through random access, and uplink synchronization can also be implemented through random access.

A beam is a shape of an electromagnetic wave transmitted by a satellite antenna on the surface of the Earth, including a global beam, a spot beam, and a shaped beam. The shape of the beam is determined by the satellite antenna.

RO means a random access channel occasion, namely, a random access occasion.

TA means a timing advance. The timing advance is a timing advance that is used by a terminal device to send uplink data to a base station based on a timing advance sent by a network device, to compensate for an impact of a propagation delay. Because a specific distance exists between the network device and the terminal device, when the terminal device communicates with the network device, a signal transmission delay is caused. If the delay is not processed, the signal transmission delay causes a problem that a message that is sent by the terminal device in a slot and that is received by the network device overlaps with another message received by the network device in a next slot. Consequently, the network device cannot correctly decode information. The timing advance is generated to resolve the problem. From a terminal device side, the timing advance is essentially a negative offset between start time of receiving a downlink subframe and time of transmitting an uplink subframe. The network device can control time at which uplink signals from different terminal devices arrive at the network device, by properly controlling an offset of each terminal device. For a terminal device that is far from the network device, because a transmission delay is large, uplink data needs to be generated in advance, in comparison with a terminal device that is close to the network device.

Uplink synchronization means that, in a same cell or beam, uplink signals sent by users at different locations in a same slot arrive at the network device at the same time, that is, signals of different users in a same slot arrive at the network device synchronously. An important feature of uplink synchronization is that different terminal devices perform orthogonal multiple access at a time frequency, that is, uplink transmission of different terminal devices in a same cell or beam does not interfere with each other. Uplink synchronization can reduce uplink multiple access interference and multiple access interference between terminal devices, and increase a cell capacity and a cell radius.

A preamble is a string of sequences sent by a user terminal to apply for accessing a network, including but not limited to a gold sequence, an m sequence, a ZC sequence, and the like. In addition to a primary sequence, the preamble may further include a cyclic prefix and guard time.

NTN means a non-terrestrial network. The non-terrestrial network is a communication network opposite to a terrestrial mobile communication network. In some areas not appropriate for establishing terrestrial base stations, such as the sea and the desert, communication may be performed by using the non-terrestrial network. Satellite communication is a type of non-terrestrial network communication, and can provide cost-effective and reliable network services in remote areas, for example, on the airplanes and over the sea, that cannot be covered by the terrestrial mobile network. The networks are extended, through satellite communication, to places that cannot be reached by the terrestrial network.

A terminal device may be a device that has a wireless transceiver function and can cooperate with a network device to provide a communication service for a user. Specifically, the terminal device may be user equipment (User Equipment, UE), an access terminal, a subscriber unit, a subscriber station, a mobile station, a mobile console, a remote station, a remote terminal, a mobile device, a user terminal, a terminal, a wireless communication device, a user agent, or a user apparatus. For example, the terminal device may alternatively be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device with a wireless communication function, a computing device, another processing device connected to a wireless modem, a vehicle-mounted device, a wearable device, a terminal device in a future 5G network or a network after 5G, or the like.

A network device may be a device configured to communicate with a terminal device. For example, the network device may be a base transceiver station (Base Transceiver Station, BTS) in a global system for mobile communications (Global System for Mobile Communications, GSM) or a code division multiple access (Code Division Multiple Access, CDMA) communication system, or may be a NodeB (NodeB, NB) in a wideband code division multiple access (Wideband Code Division Multiple Access, WCDMA) system, or may be an evolved NodeB (Evolved NodeB, eNB or eNodeB) in an LTE system, or may be a relay station, an access point, a vehicle-mounted device, a wearable device, a network-side device in a future 5G network or a network after 5G, a network device in a future evolved public land mobile network (Public Land Mobile Network, PLMN), or the like.

The network device in this application may also be referred to as a radio access network (Radio Access Network, RAN) device. The RAN device is connected to the terminal device, and is configured to receive data from the terminal device and send the data to a core network device. The RAN device corresponds to different devices in different communication systems, for example, corresponds to a base station and a base station controller in a 2G system, corresponds to a base station and a radio network controller (Radio Network Controller, RNC) in a 3G system, corresponds to an evolved NodeB (Evolved NodeB, eNB) in a 4G system, and corresponds to an access network device (for example, a gNB, a central unit CU, or a distributed unit DU) in a 5G system, for example, an NR system.

Technical solutions in this application may be applied to a new radio (New Radio, NR) communication technology. NR refers to a next-generation radio access network technology, and may be applied to a future evolved network, for example, a future 5th generation mobile communication (the 5th Generation Mobile Communication, 5G) system. The solutions in this application may further be applied to other wireless communication networks such as wireless fidelity (Wireless Fidelity, Wi-Fi) and long term evolution (Long Term Evolution, LTE). A corresponding name may also be replaced with a name of a corresponding function in another wireless communication network.

The network architecture and the service scenario that are described in the embodiments of this application are intended to describe the technical solutions in the embodiments of this application more clearly, and constitute no limitation to the technical solutions provided in the embodiments of this application. Persons of ordinary skill in the art may know that with evolution of the network architecture and emergence of new service scenarios, the technical solutions provided in this application are also applicable to similar technical problems.

FIG. 1 is a diagram of an architecture of a satellite communication system according to this application. As shown in FIG. 1, the satellite mobile communication system includes a satellite and a terminal device. The satellite is used as an access point of a terrestrial terminal, is similar to a network device in a terrestrial mobile communication system, and provides a communication service with wide-area coverage for the terrestrial terminal. The satellite communicates with the terminal by using a wireless signal. A communication protocol may be any one of terrestrial mobile communication protocols or a variant of the terrestrial mobile communication protocol. The communication protocol may be, for example, a long term evolution (Long Term Evolution, LTE) protocol or a new radio (New Radio, NR) protocol. A specific communication protocol is not specifically limited in this embodiment. The satellite generally forms a plurality of beams, and each beam is similar to a cell or sector in the terrestrial mobile communication system.

In this embodiment, the terminal device may be a wireless terminal. The wireless terminal may be a device that provides voice and/or other service data connectivity for a user, a hand-held device with a wireless connection function, or the like. The wireless terminal may be a mobile terminal, for example, a mobile phone (which is also referred to as a "cellular" phone), a computer with a mobile terminal, or a portable, pocket-sized, handheld, computer built-in, or vehicle-mounted mobile apparatus. An implementation of the wireless terminal is not specifically limited in this embodiment.

In the satellite mobile communication system, a space-air-ground integrated communication network based on a same communication protocol is attempted to be established. A major difference between non-terrestrial communication and terrestrial communication is that a large round-trip delay exists in non-terrestrial communication. This causes an impact in a random access process of a user terminal. The following describes the process with reference to FIG. 2 to FIG. 4.

Figure 2:
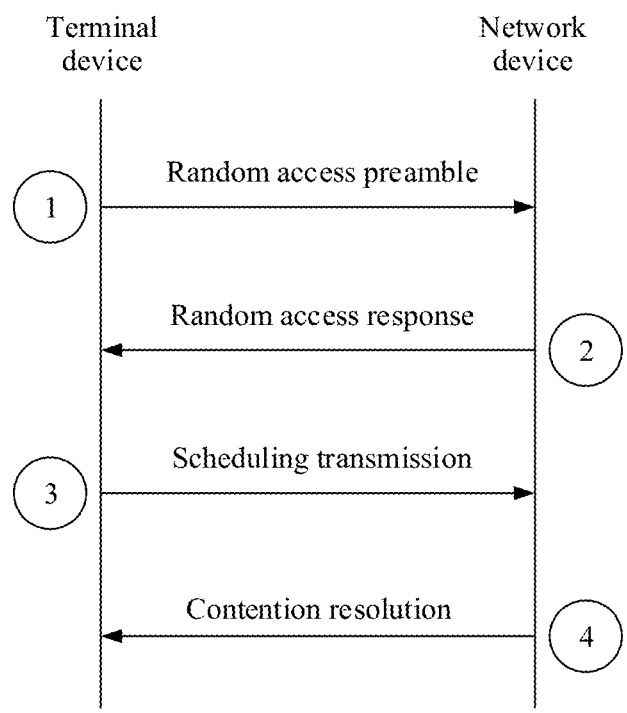
FIG. 2 is a schematic diagram of a contention-based random access process according to this application.

FIG. 2 is a schematic diagram of a contention-based random access process according to this application. As shown in FIG. 2, in NR, a contention-based random access process in which a user terminal applies to access a network includes four steps in total. Step 1: The user terminal sends a random access preamble for requesting access. Step 2: After detecting that the preamble sequence is sent, a network device sends a random access response in a downlink, where the random access response includes at least a number of the received preamble sequence, timing adjustment information, and location indication information of an uplink resource allocated to the user terminal. Step 3: After receiving the random access response, the user terminal sends uplink data on the allocated uplink resource based on the location indication information, where the uplink data includes identification information of the user terminal, and when receiving the uplink data, the network device may learn of, based on the identification information of the user terminal, a user terminal that sends each piece of uplink data. Step 4: The network device receives the uplink data of the user terminal, and returns contention resolution data to a successfully accessed user terminal based on the identification information of the user terminal.

In an NTN, a round-trip delay between a user terminal and a satellite or a base station is large. For example, a maximum round-trip delay in a geosynchronous orbit satellite communication scenario is about 270 ms. If the network device detects a preamble on a corresponding random access occasion resource after broadcasting random access configuration, a preamble detection window on a network side needs to be at least greater than the round-trip delay. Because the round-trip delay between the user terminal and the satellite is large, this causes time-frequency resource waste and energy consumption waste. Therefore, the user terminal needs to use a timing advance when sending the preamble, to reduce an impact of the round-trip delay on receiving the preamble.

Figure 3:
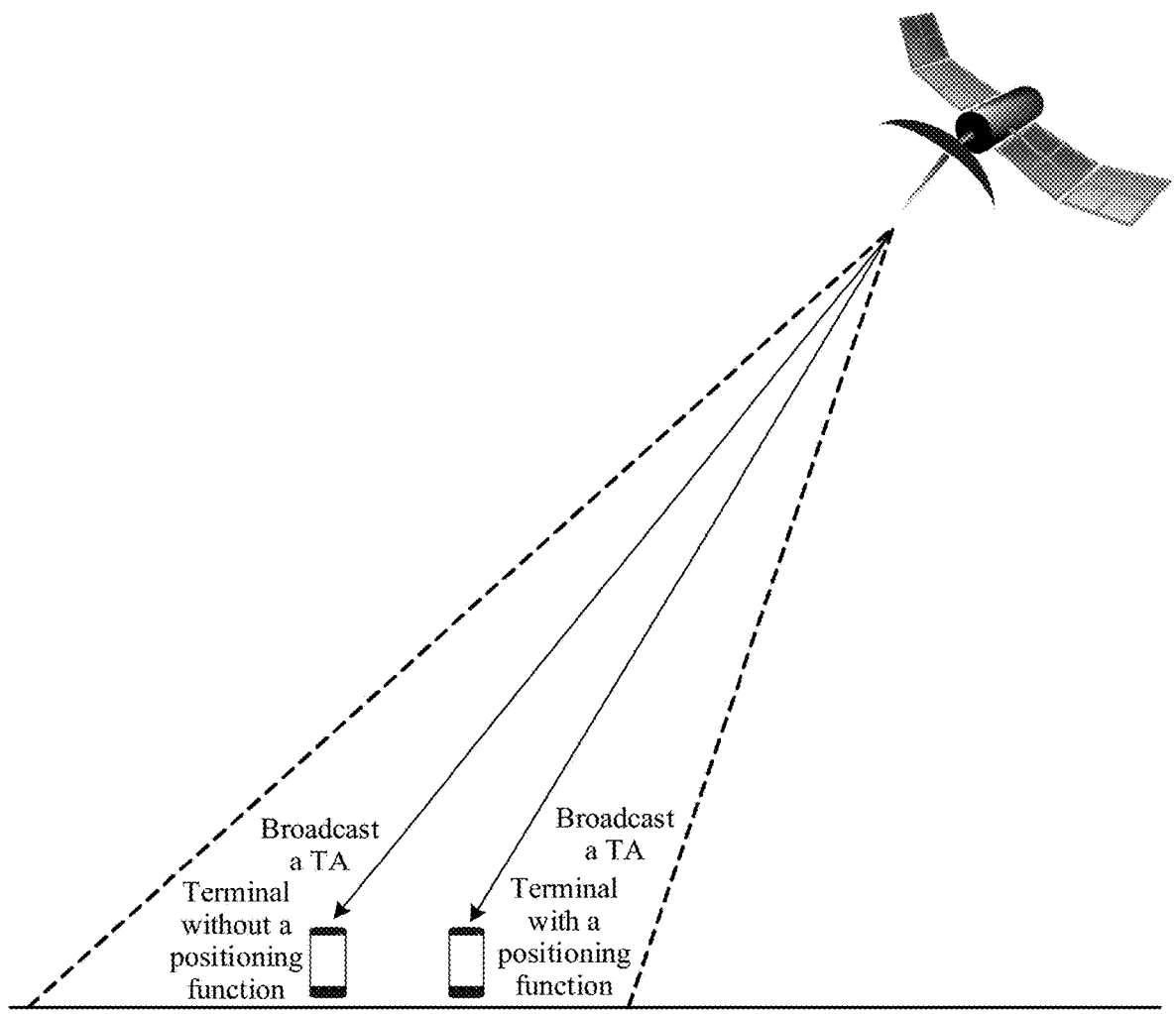
FIG. 3 is a schematic diagram of a common timing advance broadcast by a satellite according to this application.

FIG. 3 is a schematic diagram of a common timing advance broadcast by a satellite according to this application. As shown in FIG. 3, a terminal device receives a broadcast common timing advance. Terminal devices are classified into two types: a terminal device without a positioning function and a terminal device with a positioning function. The terminal device without the positioning function sends a random access preamble by using the received common timing advance. The terminal device with the positioning function obtains a timing advance through calculation based on information of the terminal device and location information (which may be obtained in ephemeris information) of the satellite.

Because a round-trip delay between the satellite and the terminal device is large, a common timing advance that needs to be broadcast is also large, and signaling overheads are large. Therefore, to reduce signaling overheads, the satellite broadcasts a partial common timing advance, and a remaining delay may be compensated on a network side. A relationship between the partial common timing advance and the common timing advance may be expressed as follows:

$$\text{Common TA} = \Delta \text{TA} + T\text{set} \tag{1}$$

Common TA is the common timing advance, $\Delta$TA is the partial common timing advance that needs to be broadcast, and Tset is a reference common timing, and needs to be compensated on the network side.

FIG. 4 is a schematic diagram of an access preamble arrival window of a terminal device according to this application. As shown in FIG. 4, when two UEs (namely, UE with a positioning function and UE without a positioning function) send random access preambles at a same random access occasion, a time difference occurs when the random access preambles of the two UEs arrive at a satellite. Consequently, interference occurs between uplink data of the UE with the positioning function that applies for access and uplink data of the UE without the positioning function that has accessed a network, and vice versa. FIG. 5 is a schematic diagram of terminal device resource allocation according to this application. As shown in FIG. 5, interference occurs, at a base station, between an uplink preamble of UE with a positioning function and uplink data of UE without a positioning function. Therefore, a time-frequency resource occupied by the corresponding UE without the positioning function needs to be not allocated for use. Similarly, interference occurs, at the base station, between an uplink preamble of the UE without the positioning function and uplink data of the UE with the positioning function. Therefore, a time-frequency resource occupied by the corresponding UE with the positioning function needs to be not allocated for use. In this way, when sending the preamble, the UE occupies twice the time-frequency resource. This problem may be referred to as arrival window time diffusion.

To resolve the foregoing problem, this application provides a random access method, to reduce time-frequency resource waste. In this application, a satellite communication system and a network device are used as an example, and specific embodiments are used to describe the technical solutions of this application in detail. The following several specific embodiments may be combined with each other, and a same or similar concept or process may not be described repeatedly in some embodiments.

This application may be applied not only to the foregoing satellite communication system, but also to another wireless communication system. It should be noted that the wireless communication system mentioned in this application includes but is not limited to a narrowband Internet of things (Narrowband Internet of Things, NB-IoT) system, a global system for mobile communications (Global System for Mobile Communications, GSM), an enhanced data rate for GSM evolution (Enhanced Data rate for GSM Evolution, EDGE) system, a wideband code division multiple access (Wideband Code Division Multiple Access, WCDMA) system, a code division multiple access 2000 (Code Division Multiple Access, CDMA2000) system, a time division-synchronous code division multiple access (Time Division-Synchronous Code Division Multiple Access, TD-SCDMA) system, a long term evolution (Long Term Evolution, LTE) system, and a new radio (New Radio, NR) mobile communication system of a fifth generation (the 5th Generation, 5G for short) mobile communication system.

Figure 6:
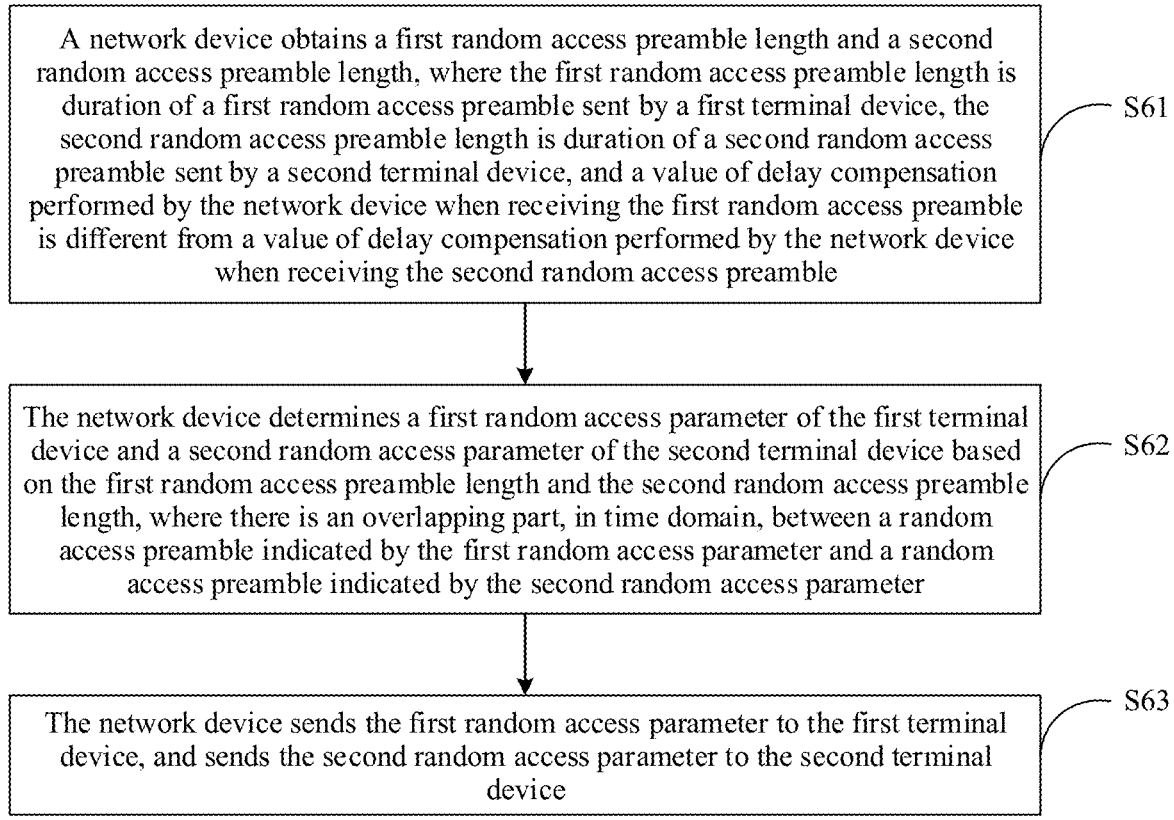
FIG. 6 is a schematic flowchart of a random access method according to this application.

FIG. 6 is a schematic flowchart of a random access method according to this application. As shown in FIG. 6, the method includes the following steps.

S61: A network device obtains a first random access preamble length and a second random access preamble length, where the first random access preamble length is duration of a first random access preamble sent by a first terminal device, the second random access preamble length is duration of a second random access preamble sent by a second terminal device, and a value of delay compensation performed by the network device when receiving the first random access preamble is different from a value of delay compensation performed by the network device when receiving the second random access preamble.

The value of delay compensation performed by the network device when the first terminal device sends the first random access preamble is different from the value of delay compensation performed by the network device when the second terminal device sends the second random access preamble. Therefore, when the first terminal device and the second terminal device send uplink data, the network device receives the uplink data sent by the first terminal device and the second terminal device at different time. Consequently, the first random access preamble sent by the first terminal device causes interference to the uplink data of the second terminal device, and the second random access preamble sent by the second terminal device causes interference to the uplink data of the first terminal device.

There are a plurality of cases in which the value of delay compensation performed by the network device on the random access preamble of the first terminal device is different from the value of delay compensation performed by the network device on the random access preamble of the second terminal device. The following describes one of the cases by using an example.

Figure 7A:
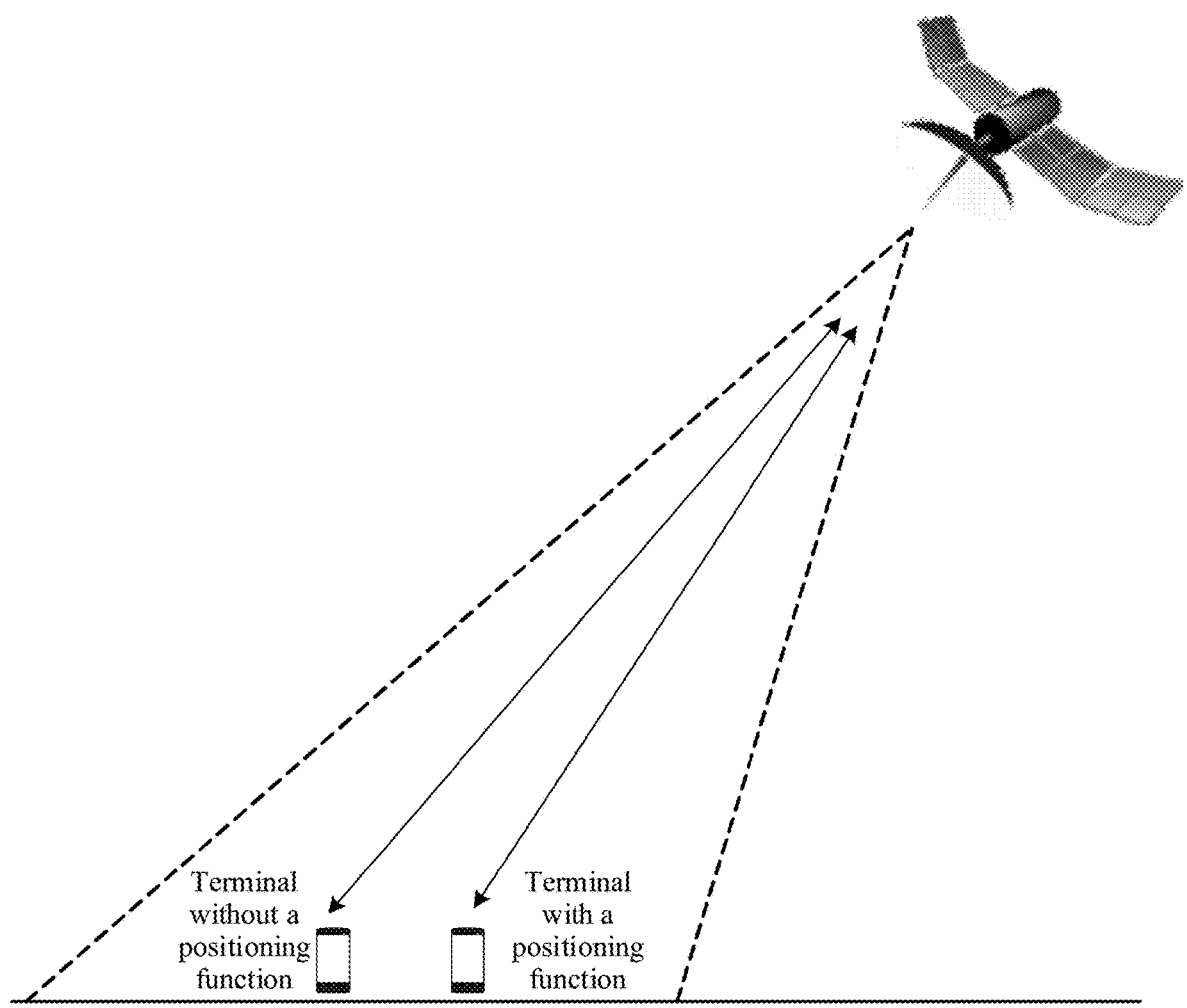
FIG. 7A is a schematic diagram of a random access process in a non-terrestrial network system architecture according to this application.

FIG. 7A is a schematic diagram of a random access process in a non-terrestrial network system architecture according to this application. As shown in FIG. 7A, the non-terrestrial network system architecture includes a satellite, the first terminal device, and the second terminal device. The satellite shown in FIG. 7A is the network device, is equivalent to a base station in a terrestrial network system, and provides a communication service for the terminal device. In a coverage area of a beam of the satellite, there are two types of terminal devices, namely, the first terminal device and the second terminal device. The first terminal device is a terminal device with a positioning function, and the second terminal device is a terminal device without a positioning function. The two types of terminal devices need to apply for accessing a network in a contention-based random access manner.

Figure 7B:
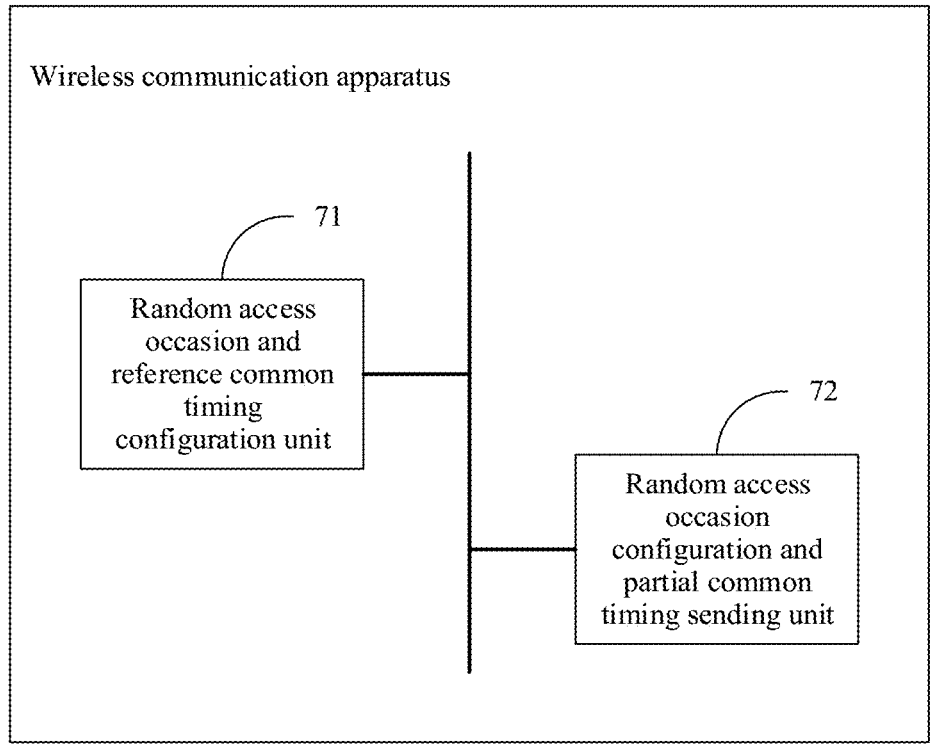
FIG. 7B is a schematic diagram of an apparatus for implementing a random access method according to this application.

FIG. 7B is a schematic diagram of an apparatus for implementing the random access method according to this application. As shown in FIG. 7B, a wireless communication apparatus is the satellite, and the wireless communication apparatus includes two units, namely, a random access occasion and reference common timing configuration unit 71 and a random access occasion configuration and partial common timing sending unit 72. The random access occasion and reference common timing configuration unit 71 is configured to configure parameters related to a random access occasion and a reference common timing, and the random access occasion configuration and partial common timing sending unit 72 is configured to send the parameters related to the random access occasion to the terminal device, where the parameters related to the random access occasion are a first random access parameter and a second random access parameter.

Because the first terminal device has the positioning function, the first terminal device may obtain a timing advance that the first terminal device needs through calculation based on a distance between a location of the first terminal device and a satellite. Because the second terminal device does not have the positioning function, the second terminal device cannot obtain the timing advance through calculation, but needs to perform random access by using the timing advance broadcast by the satellite. Because a round-trip delay between the satellite and the terminal device is large, a common timing advance that needs to be broadcast is also large, and signaling overheads are large. Therefore, to reduce signaling overheads, the satellite broadcasts a partial common timing advance, and a remaining delay may be compensated on a network device side. However, because the value of delay compensation performed by the network device on the first terminal device is different from the value of delay compensation performed by the network device on the second terminal device, the random access preamble sent by the second terminal device without the positioning function and the random access preamble sent by the first terminal device with the positioning function arrive at the network device at different time.

Figure 8:
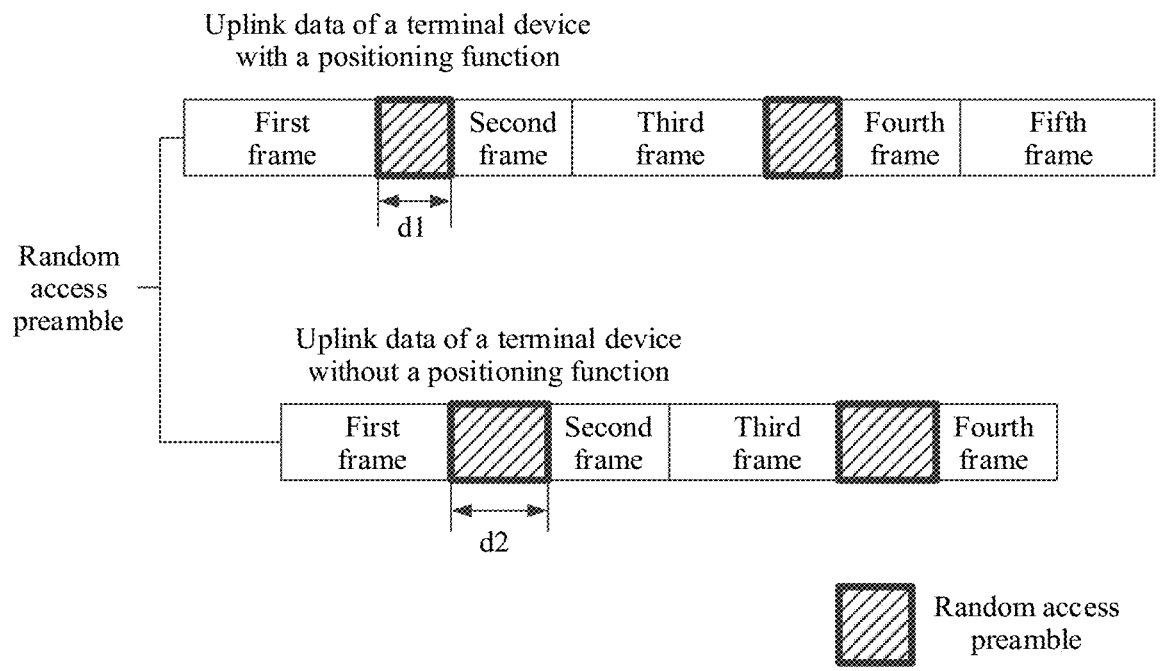
FIG. 8 is a schematic diagram 1 of a random access preamble sent by a terminal device according to this application.

The first random access preamble length is the duration of the first random access preamble sent by the first terminal device, and the second random access preamble length is the duration of the second random access preamble sent by the second terminal device. FIG. 8 is a schematic diagram 1 of random access preambles sent by terminal devices according to this application. As shown in FIG. 8, the random access preambles include the uplink data sent by the first terminal device and the uplink data sent by the second terminal device. The uplink data sent by the first terminal device includes the first random access preamble sent by the first terminal device, the duration of the first random access preamble is d1, and d1 is the first random access preamble length. Similarly, the duration of the second random access preamble sent by the second terminal device is d2, and d2 is the second random access preamble length.

The network device determines the preamble length of the first terminal device and the preamble length of the second terminal device based on a relative location (factors such as an orbit altitude and an elevation angle are considered) between beam coverage or a cell and the satellite. The first random access preamble length, the second random access preamble length (including at least one of a cyclic prefix length, a primary sequence length, and a guard interval), and configuration information (including the random access parameter and the like) related to the random access occasion need to be sent to the terminal device, and the terminal device sends the random access preamble based on the configuration information.

S62: The network device determines the first random access parameter of the first terminal device and the second random access parameter of the second terminal device based on the first random access preamble length and the second random access preamble length, where there is an overlapping part, in time domain, between a random access preamble indicated by the first random access parameter and a random access preamble indicated by the second random access parameter.

The network device needs to obtain the first random access parameter and the second random access parameter based on the first random access preamble length and the second random access preamble length. The first random access parameter is a parameter related to a random access process of the first terminal device. After obtaining the first random access parameter, the first terminal device sends the random access preamble based on the first random access parameter, and applies for a connection to the network device.

The first random access parameter generally includes one or more of a start location of the first random access preamble, a first period of the first random access preamble, and the like. The first terminal device can obtain, based on the first random access parameter, the random access occasion including a location of the first random access preamble when the first terminal device sends the uplink data to the network device, and the like.

A process of obtaining the second random access parameter is similar to a process of obtaining the first random access parameter. Details are not described herein again.

After obtaining the first random access parameter, the first terminal device performs random access based on the first random access parameter, and sends the access preamble. After obtaining the second random access parameter, the second terminal device performs random access based on the second random access parameter, and sends the access preamble. There is the overlapping part, in time domain, between the random access preamble indicated by the first random access parameter and the random access preamble indicated by the second random access parameter.

S63: The network device sends the first random access parameter to the first terminal device, and sends the second random access parameter to the second terminal device.

After obtaining the first random access parameter and the second random access parameter, the network device sends the first random access parameter to the first terminal device, and sends the second random access parameter to the second terminal device. After the first terminal device sends the access preamble based on the first random access parameter, and the second terminal device sends the access preamble based on the second random access parameter, there is the overlapping part between the access preambles of the two terminal devices. Therefore, time-frequency resource waste is not caused due to the overlapping part.

FIG. 9 is a schematic diagram 2 of the random access preambles sent by the terminal devices according to this application. The following is described by using an example in which the first terminal device is a terminal device with a positioning function and the second terminal device is a terminal device without a positioning function. As shown in FIG. 9, when the first random access parameter and the second random access parameter are not adjusted, the access preamble of the first terminal device does not overlap with the access preamble of the second terminal device. Therefore, a range that is in the uplink data of the second terminal device and that corresponds to the access preamble of the first terminal device cannot allocate a time-frequency resource, and resource waste is caused. Similarly, the access preamble of the second terminal device does not overlap with the access preamble of the first terminal device. Therefore, a range that is in the uplink data of the first terminal device and that corresponds to the access preamble of the second terminal device cannot allocate a time-frequency resource, and resource waste is caused.

A shaded part shown in FIG. 9 shows the first random access preamble of the first terminal device and the second random access preamble of the second terminal device, and a black part shown in FIG. 9 shows a range in which a time-frequency resource is not allocated to avoid data interference. It can be learned from the upper part in FIG. 9 that, when the random access preamble of the first terminal device does not overlap with the random access preamble of the second terminal device, to avoid mutual interference between data, a time-frequency resource needs to be not allocated in duration in which total duration of the random access preamble of the first terminal device is equal to total duration of the random access preamble of the second terminal device. The duration of the random access preamble is equal to the duration in which a time-frequency resource is not allocated, that is, total duration of the shaded part is equal to total duration of the black part in FIG. 9.

Because a time-frequency resource is not allocated in the black part in FIG. 9, this causes time-frequency resource waste. Therefore, duration in which a resource is not allocated needs to be minimized. In this application, after the first random access parameter and the second random access parameter are adjusted, there is the overlapping part, in time domain, between the random access preamble of the first terminal device and the random access preamble of the second terminal device, where overlapping may be complete overlapping or partial overlapping.

Complete overlapping means that the first random access preamble length is equal to the second random access preamble length, and a start location at which the random access preamble of the first terminal device arrives at the network device is the same as a start location at which the random access preamble of the second terminal device arrives at the network device. In this case, complete overlapping is implemented, and a range in which a time-frequency resource is not allocated does not need to be set. This can minimize resource waste.

Partial overlapping is another case other than complete overlapping. Partial overlapping means that the first random access preamble length does not need to be equal to the second random access preamble length, and the start location at which the random access preamble of the first terminal device arrives at the network device does not need to be the same as the start location at which the random access preamble of the second terminal device arrives at the network device. Provided that the random access preamble of the first terminal device at least partially overlaps with the random access preamble of the second terminal device, the solution in the lower part in FIG. 9 saves more resources than the solution in the upper part in FIG. 9.

The lower part shown in FIG. 9 shows a case in which the random access preamble of the first terminal device partially overlaps with the random access preamble of the second terminal device when the two random access preambles arrive at the network device. In a part that the two random access preambles do not overlap, to avoid interference, a range, namely, a black part in FIG. 9, in which a time-frequency resource is not allocated also needs to be set. In a case in which the two random access preambles partially overlap, a range in which a time-frequency resource is not allocated still needs to be set. However, in comparison with a case in which the two random access preambles do not overlap, a range in which a time-frequency resource is not allocated is greatly reduced, that is, duration of the black part in the lower part in FIG. 9 is shorter than the duration of the black part in the upper part in FIG. 9. Therefore, it can be learned that when the random access preamble of the first terminal device at least partially overlaps with the random access preamble of the second terminal device, a time-frequency resource can be saved, and waste can be reduced.

In the random access method according to this application, the network device first determines the first random access preamble length used by the first terminal device and the second random access preamble length used by the second terminal device based on the relative location (factors such as an orbit altitude and an elevation angle are considered) between the beam coverage or the cell and the satellite. Then, the network device determines the first random access parameter of the first terminal device and the second random access parameter of the second terminal device based on the first random access preamble length and the second random access preamble length. Finally, the network device sends the first random access parameter to the first terminal device and sends the second random access parameter to the second terminal device. Therefore, the first terminal device performs random access based on the first random access parameter, and the second terminal device performs random access based on the second random access parameter. Because there is the overlapping part, in time domain, between the random access preamble indicated by the first random access parameter and the random access preamble indicated by the second random access parameter, interference caused by the preamble to the uplink data can be reduced, and time-frequency resource waste is reduced.

Based on the foregoing embodiments, the following describes the technical solutions of this application in detail by using specific embodiments. The following several specific embodiments may be combined with each other, and a same or similar concept or process may not be described repeatedly in some embodiments.

Figure 10:
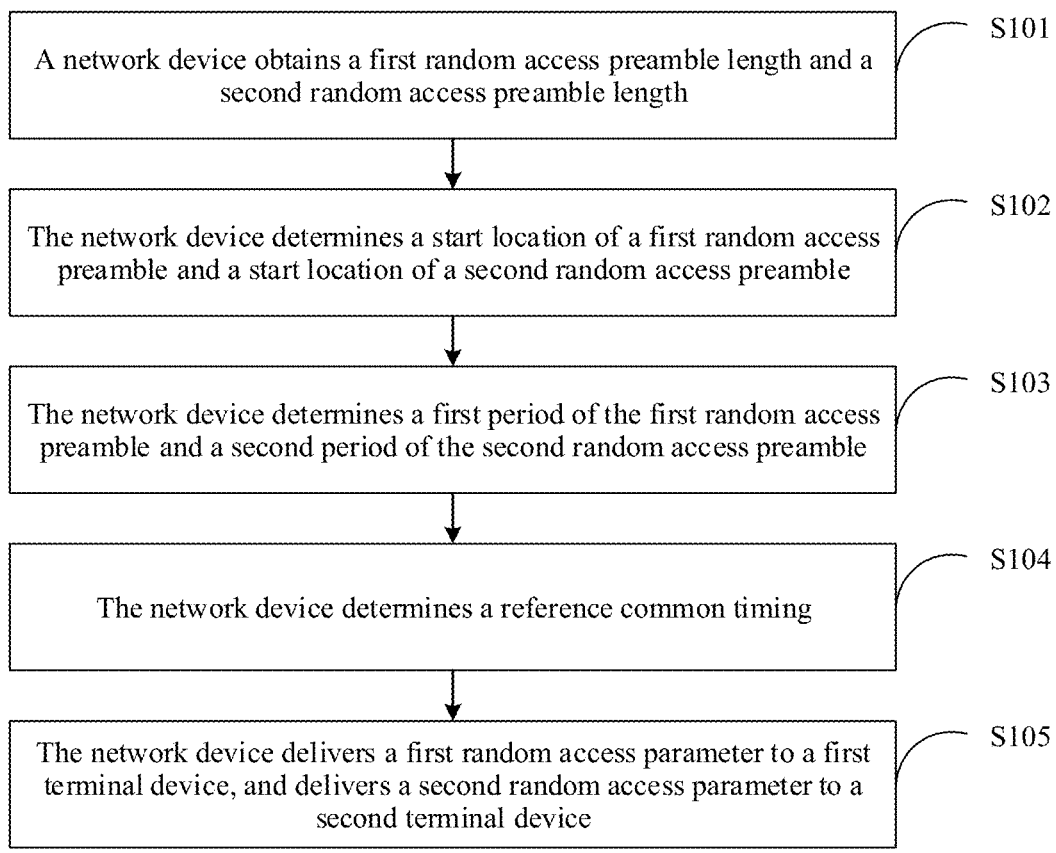
FIG. 10 is a schematic flowchart of a random access method according to another embodiment of this application.

FIG. 10 is a schematic flowchart of a random access method according to another embodiment of this application. As shown in FIG. 10, the method includes the following steps.

S101: A network device obtains a first random access preamble length and a second random access preamble length.

S102: The network device determines a start location of a first random access preamble and a start location of a second random access preamble.

Figure 11:
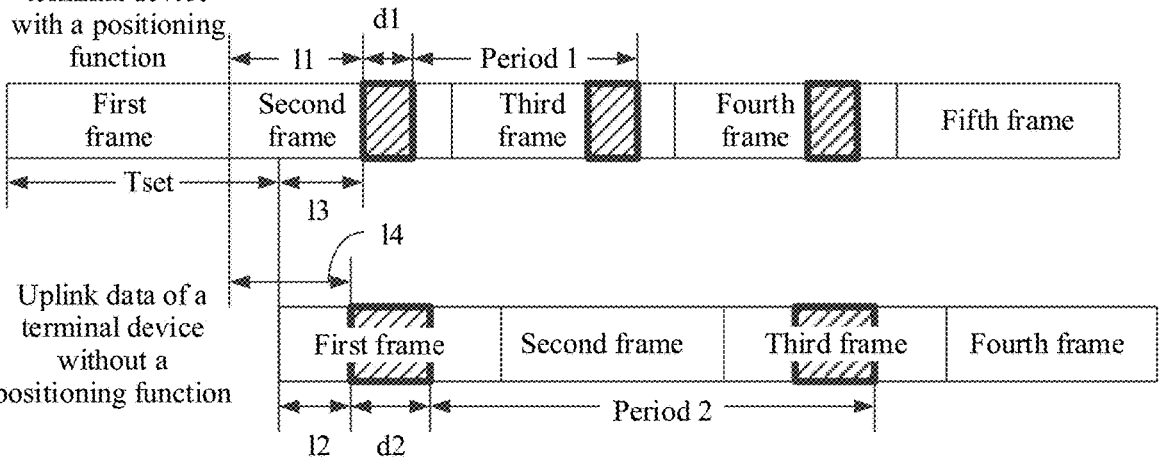
FIG. 11 is a schematic diagram of overlapping of a preamble detection window of a terminal device according to this application.

FIG. 11 is a schematic diagram of overlapping of a preamble detection window of a terminal device according to this application. The preamble detection window is the random access preamble that is sent by the terminal device and that is received by the network device. As shown in FIG. 11, the preamble detection window includes downlink data, uplink data of a first terminal device, and uplink data of a second terminal device. This application is described by using an example in which the first terminal device is a terminal device with a positioning function and the second terminal device is a terminal device without a positioning function. Another case is similar to the foregoing case. For example, the first terminal device is a terminal device without a positioning function and the second terminal device is a terminal device with a positioning function, or a value of delay compensation performed, at a receive end, by the network device on the uplink random access preamble sent by the first terminal device is different from a value of delay compensation performed, at a receive end, by the network device on the uplink random access preamble sent by the second terminal device. Details are not described herein again.

The solution used in this application is determining the start location of the first random access preamble and the start location of the second random access preamble based on the first random access preamble length and the second random access preamble length, so that there is an overlapping part between the random access preamble of the first terminal device and the random access preamble of the second terminal device.

In this application, an example in which each time unit is one frame of data is used for description. As shown in FIG. 11, it is assumed that the first random access preamble length is d1, a first time unit in which the first random access preamble is located is a second frame of the uplink data of the first terminal device, the second random access preamble length is d2, and a second time unit in which the second random access preamble is located is a first frame of the uplink data of the second terminal device. It is assumed that first duration of an interval between the first random access preamble and a start location of the first time unit in which the first random access preamble is located is l1, and second duration of an interval between the second random access preamble and a start location of the second time unit in which the second random access preamble is located is l2, where l1 and l2 need to be determined based on d1 and d2.

In the solution used in this application, an absolute value of a difference between the first duration of the interval and the second duration of the interval is less than or equal to an absolute value of a difference between the first random access preamble length and the second random access preamble length. The first duration of the interval is duration of an interval between the start location of the first random access preamble and a reference boundary, and the second duration of the interval is duration of an interval between the start location of the second random access preamble and the reference boundary. The reference boundary corresponding to the first duration of the interval and the reference boundary corresponding to the second duration of the interval are a same reference boundary. The reference boundary may be selected based on an actual requirement. The following is described by using an example in which the reference boundary is the start location of the first time unit or the start location of the second time unit.

When the reference boundary is the start location of the first time unit, that is, the reference boundary is a start location of the second frame of the uplink data of the first terminal device in FIG. 11, the first duration of the interval is duration of an interval between the start location of the first random access preamble and the start location of the second frame of the uplink data of the first terminal device, namely, l1 in FIG. 11, and the second duration of the interval is duration of an interval between the start location of the second random access preamble and the start location of the second frame of the uplink data of the first terminal device, namely, l4 in FIG. 11. In this case, the following formula is met:

$$|l4-l1| <= |d2-d1| \qquad (2).$$

When the reference boundary is the start location of the second time unit, that is, the reference boundary is a start location of the first frame of the uplink data of the second terminal device in FIG. 11, the first duration of the interval is duration of an interval between the start location of the first random access preamble and the start location of the first frame of the uplink data of the second terminal device, namely, l3 in FIG. 11, and the second duration of the interval is duration of an interval between the start location of the second random access preamble and the start location of the first frame of the uplink data of the second terminal device, namely, l2 in FIG. 11. In this case, the following formula is met:

$$|l3-l2| <= |d2-d1| \qquad (3).$$

Both the formula (2) and the formula (3) are a first-type restriction condition that causes overlapping between random access preambles of terminal devices. Meanings expressed by the two formulas are the same, and the restriction condition can maximize an overlapping area between the random access preamble of the first terminal device and the random access preamble of the second terminal device.

It should be noted that the reference boundary may be any location, and is not limited to the start location of the first time unit or the start location of the second time unit. The foregoing embodiment is merely described by using an example in which the reference unit is the start location of the first time unit or the start location of the second time unit. When the network device delivers a random access parameter to the terminal device, the network device sends only the first duration between the start location of the first random access preamble and the first time unit to the first terminal device, and the first terminal device can determine a location of the first random access preamble in the uplink data based on the first duration. Similarly, the network device sends the second duration between the start location of the second random access preamble and the second time unit to the second terminal device, and the second terminal device can determine a location of the second random access preamble in the uplink data based on the second duration.

However, the first terminal device cannot learn of the start location of the second time unit, and the second terminal device cannot learn of the start location of the first time unit. Therefore, after determining the reference boundary, and determining the first duration of the interval and the second duration of the interval based on the first random access preamble length d1 and the second random access preamble length d2, the network device obtains, based on a location of the reference boundary, the first duration of the interval, and the second duration of the interval, the first duration of the interval l1 between the first random access preamble and the start location of the first time unit in which the first random access preamble is located, and the second duration of the interval l2 between the second random access preamble and the start location of the second time unit in which the second random access preamble is located; and sends the first duration l1 to the first terminal device, and sends the second duration l2 to the second terminal device.

S103: The network device determines a first period of the first random access preamble and a second period of the second random access preamble.

The first period is duration between start locations of any two adjacent first random access preambles or duration between end locations of any two adjacent first random access preambles. The second period is duration between start locations of any two adjacent second random access preambles or duration between end locations of any two adjacent second random access preambles. FIG. 11 shows the duration between end locations of any two adjacent first random access preambles, namely, a period 1 in FIG. 11, and the duration between end locations of any two adjacent second random access preambles, namely, a period 2 in FIG. 11.

In this application, duration of the second period is M times duration of the first period, and M is a positive integer. Alternatively, duration of the first period is N times duration of the second period, and N is a positive integer. To be specific, $$\text{period } 2 = M \times \text{period } 1 \qquad (4).$$

Alternatively, $$\text{period } 1 = N \times \text{period } 2 \qquad (5).$$

Both the formula (4) and the formula (5) are a second-type restriction condition that causes overlapping between the random access preambles of the terminal devices, and the restriction condition can maximize a quantity of overlapping resources between the random access preamble of the first terminal device and the random access preamble of the second terminal device.

FIG. 11 is used as an example for description. In FIG. 11, the second period is twice the first period, that is, period 2=2× period 1. In FIG. 11, the first random access preamble of the first terminal device overlaps with the first second random access preamble of the second terminal device to the utmost. Because the second period is twice the first period, the third first random access preamble of the first terminal device overlaps with the second random access preamble of the second terminal device to the utmost. In FIG. 11, the first random access preamble of the first terminal device is a random access preamble in the second frame of the uplink data of the first terminal device. The third first random access preamble of the first terminal device is a random access preamble in a fourth frame of the uplink data of the first terminal device. The first second random access preamble of the second terminal device is a random access preamble in the first frame of the uplink data of the second terminal device. The second random access preamble of the second terminal device is a random access preamble in a third frame of the uplink data of the second terminal device.

The first period and the second period are limited, that is, the first period is an integer multiple of the second period or the second period is an integer multiple of the first period. Therefore, after a larger period of the first period and the second period, the first random access preamble can overlap with the second random access preamble again, that is, the first random access preamble periodically overlaps with the second random access preamble in a specific period. Therefore, after the network device delivers the first period to the first terminal device and delivers the second period to the second terminal device, when the first terminal device sends the first random access preamble to the network device based on the first period and the second terminal device sends the second random access preamble to the network device based on the second period, a quantity of overlapping resources between the random access preamble of the first terminal device and the random access preamble of the second terminal device can be maximized.

S104: The network device determines a reference common timing.

The reference common timing is a timing advance for compensation performed by the network device. In this application, the reference common timing is an integer multiple of a third time unit, and the third time unit may be slot duration, subframe duration, or frame duration. Correspondingly, the reference common timing may be an integer multiple of the slot duration, an integer multiple of the subframe duration, or an integer multiple of the frame duration. To be specific, $$T\text{set} = n \times \text{slot\_duration} \quad (6);$$

$$T\text{set} = n \times \text{subframe\_duration} \quad (7); \text{ and}$$

$$T\text{set} = n \times \text{frame\_duration} \quad (8).$$

Tset is the reference common timing, n is an integer, slot_duration is the slot duration, subframe_duration is the subframe duration, and frame_duration is the frame duration.

A slot is a minimum unit for data transmission, one subframe may include one or more slots, and one frame may include one or more subframes. For example, frame duration of an orthogonal frequency division multiple access (Orthogonal Frequency Division Multiple Access, OFDMA for short) signal is 10 ms, one frame of 10 ms is divided into 10 subframes with duration of 1 ms, and each subframe of 1 ms is divided into two slots, that is, each slot is 0.5 ms.

Because the frame duration is an integer multiple of the subframe duration, and the subframe duration is an integer multiple of the slot duration, when the reference common timing is an integer multiple of the frame duration or an integer multiple of the subframe duration, the reference common timing is also an integer multiple of the slot duration. Further, the third time unit may be any one of the slot duration, the subframe duration, or the frame duration, or may indicate only the slot duration.

A timing boundary of the first terminal device can be aligned with a timing boundary of the second terminal device by setting the reference common timing. Therefore, the overlapping part between the random access preamble of the first terminal device and the random access preamble of the second terminal device can be maximized.

S105: The network device delivers a first random access parameter to the first terminal device, and delivers a second random access parameter to the second terminal device.

The first random access parameter includes at least one of the first duration or the first period, and the second random access parameter includes at least one of the second duration or the second period. The network device may broadcast the random access parameter to all terminal devices or send random access parameters to corresponding terminal devices. In this application, the network device learns of the reference common timing, and does not deliver the reference common timing to the first terminal device and the second terminal device. The network device only broadcasts a partial common timing, so that timing advances used by the first terminal device and the second terminal device are different.

After receiving the corresponding random access parameter, the terminal device performs random access based on the received random access parameter. In this application, three types of restriction conditions are set in total for a random access process. As described in the foregoing embodiments, the three types of restriction conditions are respectively as follows:

The first-type restriction condition is that |l4−l1|<=|d2−d1|, or |l3−l2|<=|d2−d1|. To be specific, an absolute value of a difference between the first duration and third duration is less than or equal to the absolute value of the difference between the first random access preamble length and the second random access preamble length, and the third duration is duration of an interval between the start location of the second random access preamble and the start location of the first time unit in which the first random access preamble is located.

The second-type restriction condition is that period 2=M× period 1, or period 1=N×period 2. To be specific, the first period is an integer multiple of the second period, or the second period is an integer multiple of the first period.

A third-type restriction condition is that Tset=n×slot_duration, Tset=n×subframe_duration, or Tset=n×frame_duration. To be specific, the reference common timing is an integer multiple of the slot duration, an integer multiple of the subframe duration, or an integer multiple of the frame duration.

In the foregoing restriction conditions, the first-type restriction condition can ensure that the overlapping area between the random access preamble of the first terminal device and the random access preamble of the second terminal device is maximized, the second-type restriction condition can ensure that the quantity of overlapping resources between the random access preamble of the first terminal device and the random access preamble of the second terminal device is maximized, and the third-type restriction condition can ensure that the uplink data of the second terminal device is aligned with a timing boundary of downlink data on a network device side. When some of the foregoing three types of restriction conditions are met, the random access preamble of the first terminal device may partially overlap with the random access preamble of the second terminal device. When the foregoing three types of restriction conditions are met, the random access preamble of the first terminal device may overlap with the random access preamble of the second terminal device to the utmost. This minimizes interference caused by the random access preamble of the terminal device to uplink data of another terminal device, ensures that a total quantity of time-frequency resources occupied by the random access preamble of the first terminal device and the random access preamble of the second terminal device is minimized, and saves time-frequency resources to the utmost.

To describe the solution of this application more specifically, the following describes the solution of this application in detail with reference to the accompanying drawings and by using specific embodiments.

Figure 12:
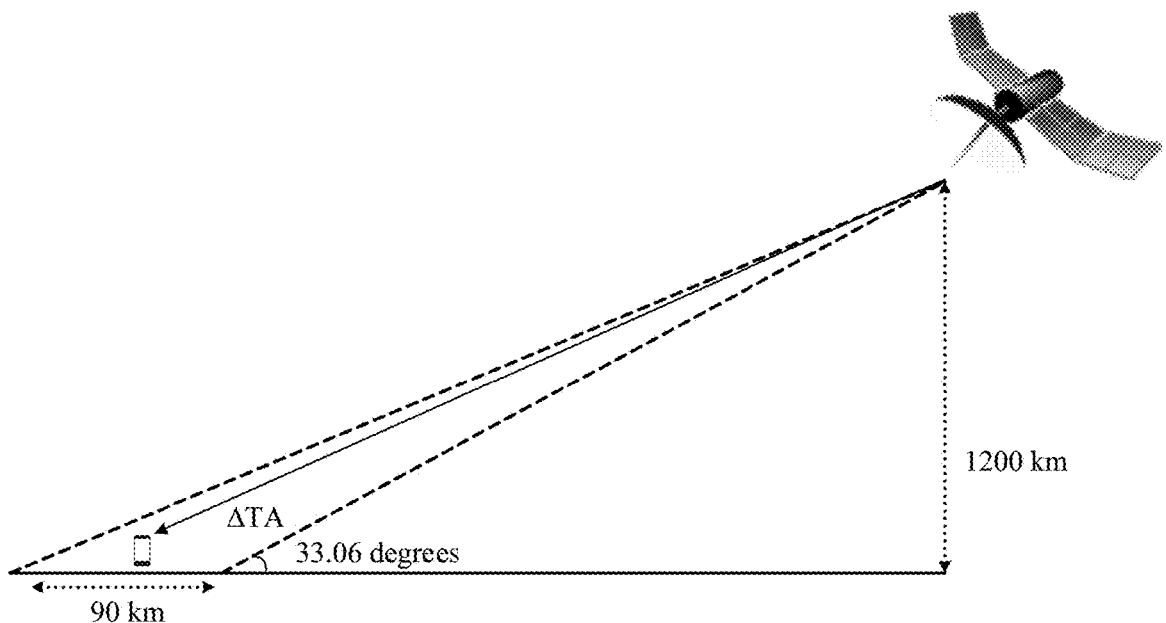
FIG. 12 is a schematic diagram of a partial common timing advance broadcast by a satellite according to this application.

FIG. 12 is a schematic diagram of a partial common timing advance broadcast by a satellite according to this application. As shown in FIG. 12, it is assumed that the satellite is in a regenerative (regenerative) mode, that is, the satellite has a processing capability such as encoding and decoding a signal. In an example in FIG. 12, an altitude of an orbit in which the satellite is located is 1200 km, the satellite transmits a plurality of beams, a diameter of each beam is 90 km, and a minimum elevation angle of UE in a coverage area of the beam is 10 degrees. As shown in FIG. 12, the satellite broadcasts a partial common timing advance ΔTA to UE in a beam/cell.

It is assumed that a first terminal device is a terminal device with a positioning function, and a second terminal device is a terminal device without a positioning function. It is assumed that a first random access preamble length of the first terminal device is d1=2.1 ms, and a second random access preamble length of the second terminal device is d2=3.6 ms. The following allocates time-frequency resources of random access preambles to two types of terminal devices based on the foregoing three-types of restriction conditions in this application.

The satellite may calculate a common timing advance of a beam/cell covered by the satellite based on a shortest distance between the satellite and the beam/cell, or may calculate a common timing advance of a beam/cell by using another reference location. This is not limited in this application. The common timing advance of the beam/cell is as follows:

$$\text{Common } TA = \frac{2S}{c}.$$

Common TA is the common timing advance, S is a distance between the reference location and the satellite, and c is a transmission speed of an electromagnetic wave, and may be $3 \times 10^8$ m/s or the like.

The common timing advance of the beam/cell may be calculated based on a scenario in FIG. 12.

It is assumed that a distance between the satellite and a terminal device nearest to the beam is S, and an included angle between the ground and a connection line between the terminal device and the satellite is 33 degrees as shown in FIG. 12. In this case, it can be learned according to the right-angle triangle theorem:

If sin 33 degrees=1200 km/S=0.545,

S=1200 km/0.545=2201.835 km, and $$\text{Common } TA = \frac{2S}{c} = \frac{2 \times 2201.835 \text{ km}}{3 \times 10^8 \text{ m/s}} = 14.67 \text{ ms}.$$

It can be learned that in the scenario in FIG. 12, the common timing advance of the beam/cell is 14.67 ms.

After the common timing advance, the first random access preamble length, and the second random access preamble length are obtained, a first random access parameter, a second random access parameter, and a reference common timing need to be determined based on the common timing advance, the first random access preamble length, and the second random access preamble length. The following is described with reference to FIG. 13.

Figure 13:
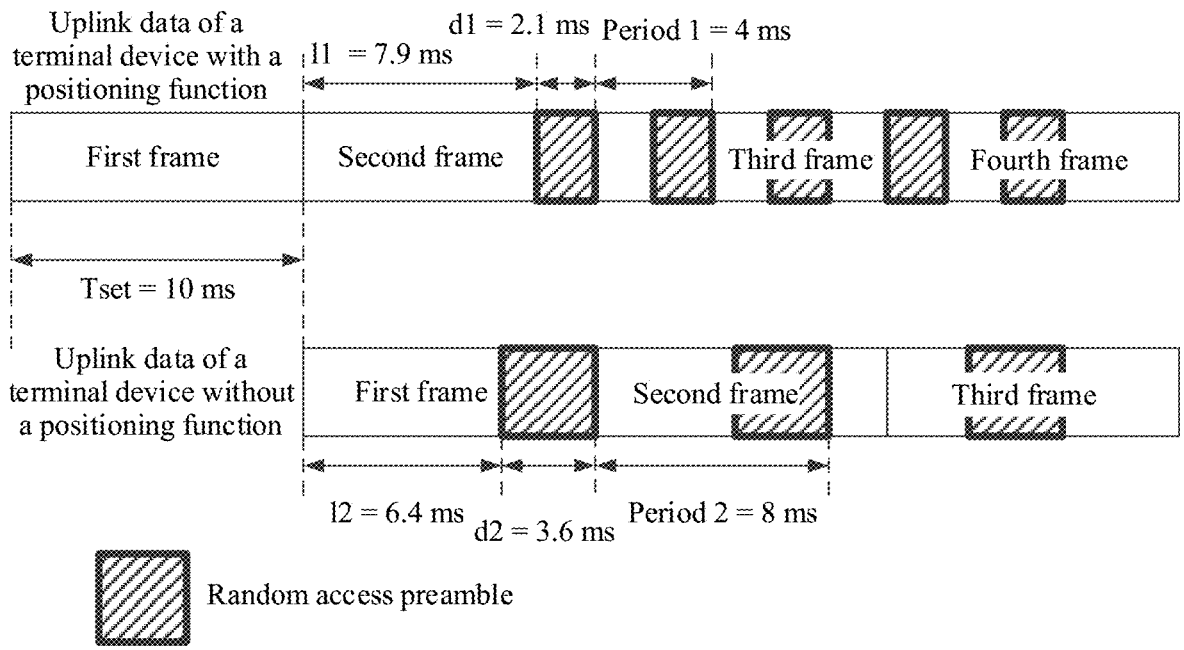
FIG. 13 is a schematic diagram 1 of time-frequency resource allocation of a random access preamble of a terminal device according to this application.

FIG. 13 is a schematic diagram 1 of time-frequency resource allocation of a random access preamble of a terminal device according to this application. As shown in FIG. 13, time-frequency resource allocation is performed by using the three types of restriction conditions in the foregoing embodiments. FIG. 13 is a schematic diagram that shows a random access preamble arrival window or a preamble detection window at a receive end. FIG. 13 is a schematic diagram of a timing relationship between a downlink data frame and a received uplink data frame on a satellite side. The uplink data frame includes uplink data of the first terminal device (a user terminal device with a positioning function) and uplink data of the second terminal device (a user terminal device without a positioning function).

In FIG. 13, d1 indicates the first random access preamble length, and d2 indicates the second random access preamble length, where d1 and d2 may correspond to lengths of preamble arrival windows (preamble detection windows) at the receive end. The foregoing first-type restriction condition is used to determine a distance l1 from the first terminal device to a reference boundary and a distance l2 from the second terminal device to the reference boundary, where the reference boundary in FIG. 13 is an uplink data frame boundary of the second terminal device.

A difference between the first random access preamble length and the second random access preamble length is as follows:

d2−d1=3.6 ms−2.1 ms=1.5 ms.

Therefore, an absolute value of a difference between l1 and l2 needs to be less than or equal to 1.5 ms, where l1 is a distance between a start location of a first random access preamble and the uplink data frame boundary of the second terminal device, and l2 is a distance between a start location of a second random access preamble and the uplink data frame boundary of the second terminal device.

In this application, l1 is set to 7.9 ms, and l2 is set to 6.4 ms. In this way, |l2−l1|<=|d2−d1| is met, that is, the first-type restriction condition is met. It should be noted that, that l1 is set to 7.9 ms and l2 is set to 6.4 ms is merely an example, and provided that |l2−l1|<=|d2−d1| is met, any value of l1 and l2 can meet a requirement.

After l1 and l2 are determined, a first period and a second period need to be determined. In FIG. 13, a period 1 is used to indicate the first period, and a period 2 is used to indicate the second period. Based on the second-type restriction condition, the first period is an integer multiple of the second period, or the second period is an integer multiple of the first period. Therefore, the period 1 and the period 2 of the two types of terminal devices are determined, and periods of random access occasions of the two types of terminal devices are in an integer multiple relationship. In this application, the first period, the period 1, of the first terminal device is set to 4 ms, and the second period, the period 2, of the second terminal device is set to 8 ms. In this case, the second period is twice the first period, and the second-type restriction condition is met. It should be noted that setting of the first period and the second period in this application is merely an example. Other setting that enables the first period to be an integer multiple of the second period or enables the second period to be an integer multiple of the first period may also be implemented. For example, the period 1 may be set to 8 ms, and the period 2 may be set to 4 ms, or the like. This is not specifically limited in this application.

Finally, the reference common timing used by a system is determined based on the third-type restriction condition, where the reference common timing is an integer multiple of a slot length, a subframe length, or a frame length. In this application, the reference common timing Tset is set to 10 ms, where 10 ms is exactly duration of one frame in an example in FIG. 13. In this case, the reference common timing is equal to frame duration, and the third-type restriction condition is met. When the reference common timing is determined to be 10 ms, the satellite broadcasts a partial common timing advance ΔTA, namely 4.67 ms, to a terminal device in the beam/cell.

In FIG. 13, because the reference common timing Tset is determined to be 10 ms, and is equal to the frame duration, a boundary of a frame in which the first random access preamble is located is aligned with a boundary of a frame in which the second random access preamble is located. Therefore, first duration of an interval between the start location of the first random access preamble and a start location of the frame in which the first random access preamble is located is 7.9 ms, and second duration of an interval between the start location of the second random access preamble and a start location of the frame in which the second random access preamble is located is 6.4 ms. A network device sends the first duration and the first period to the first terminal device, and sends the second duration and the second period to the second terminal device.

Based on setting of the foregoing three types of restriction conditions, it can be finally learned from FIG. 13 that the preamble arrival window (or the preamble detection window) of the first terminal device can overlap, in time domain, with the preamble arrival window of the second terminal device to the utmost.

In addition to the example shown in FIG. 13, another possible case may exist. The following is described with reference to FIG. 14 and FIG. 15.

In a possible implementation, the first terminal device has a plurality of consecutive random access preamble arrival windows/preamble detection windows, that is, two consecutive random access occasions. A plurality of consecutive random access occasions in this application are two or more consecutive random access occasions.

An application scenario of this embodiment is also a satellite communication scenario shown in FIG. 12. It is assumed that the satellite is in a regenerative mode, an altitude of an orbit in which the satellite is located is 1200 km, a diameter of each beam is 90 km, and a minimum elevation angle of UE in a coverage area of the beam is 10 degrees. The satellite broadcasts the partial common timing advance ΔTA to the UE in the beam/cell. The satellite may calculate the common timing advance of the beam/cell covered by the satellite based on the shortest distance between the satellite and the beam/cell. The common timing advance of the beam/cell may be calculated based on the scenario in FIG. 12, and is 14.67 ms. The following is described by using an example in which the first terminal device has two consecutive random access occasions.

Figure 14:
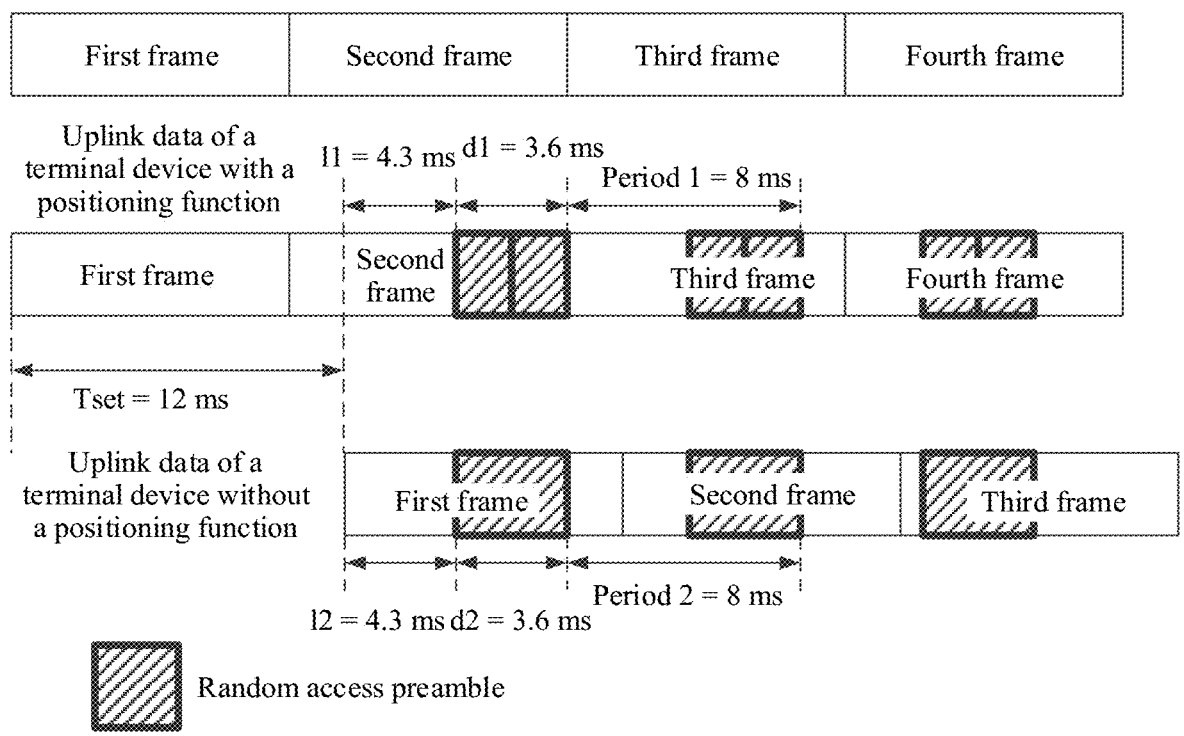
FIG. 14 is a schematic diagram 2 of time-frequency resource allocation of a random access preamble of a terminal device according to this application.

FIG. 14 is a schematic diagram 2 of time-frequency resource allocation of a random access preamble of a terminal device according to this application. As shown in FIG. 14, it is assumed that the first terminal device has two consecutive random access occasions, and a random access preamble length, a length of a preamble arrival window, or a length of a preamble detection window is 1.8 ms. Therefore, when the first terminal device has two consecutive random access occasions, a total length of two consecutive random access preambles/preamble detection windows of the first terminal device is 3.6 ms. In this application, the two consecutive random access preambles need to be processed as one random access preamble. To be specific, the first random access preamble length d1 in the embodiment shown in FIG. 14 is set to 3.6 ms. The second random access preamble length d2, the length of the preamble arrival window, or the length of preamble detection window of the second terminal device is 3.6 ms. The following allocates time-frequency resources of random access preambles to two types of terminal devices based on the foregoing three-types of restriction conditions in this application.

The reference boundary in an example in FIG. 14 is a start location of a second time unit in which the second random access preamble is located. The first-type restriction condition is used to determine the distance l1 between a start location of a random access preamble of the first terminal device and the reference boundary and the distance l2 between a start location of a random access preamble of the second terminal device and the reference boundary. Because d1=d2, and the difference between d1 and d2 is 0, l1 needs to be equal to l2, to meet the first-type restriction condition. In this application, l1 is set to 4.3 ms, and l2 is set to 4.3 ms. In this way, the condition in which |l2−l1|<=|d2−d1| is met.

In FIG. 14, the period 1 and the period 2 respectively indicate the first period of the first terminal device and the second period of the second terminal device. The period 1 and the period 2 of the two types of terminal devices are determined based on the second-type restriction condition. Therefore, the periods of the random access occasions of the two types of terminal devices are in an integer multiple relationship. In this application, the first period, the period 1, of the random access occasion of the first terminal device is set to 8 ms, and the second period, the period 2, of the random access occasion of the second terminal device is set to 8 ms. In this case, the second-type restriction condition is met.

Finally, the reference common timing used by the system is determined based on the third-type restriction condition, where the reference common timing is an integer multiple of the slot length, the subframe length, or the frame length. In this application, when the reference common timing Tset is set to 12 ms, the satellite broadcasts the partial common timing advance ΔTA, namely 2.67 ms, to the terminal device in the beam/cell.

After the reference common timing is obtained, the first random access parameter and the second random access parameter need to be obtained. The first period and the second period are determined. To be specific, the first period, the period 1, is equal to 8 ms, the second period, the period 2, is equal to 8 ms, and the second duration is equal to l2 and is 4.3 ms. The first duration further needs to be obtained through calculation based on l1.

As shown in FIG. 14, duration of one frame of uplink data is 10 ms, the first random access preamble length d1 is 3.6 ms, and an end location of the first random access preamble is exactly an end location of the frame. Therefore, the first duration between the start location of the first random access preamble and a start location of a first time unit in which the first random access preamble is located is 10 ms−3.6 ms=6.4 ms. The network device sends the first duration and the first period to the first terminal device, and sends the second duration and the second period to the second terminal device.

Based on setting of the foregoing three types of restriction conditions, it can be finally learned from FIG. 14 that the preamble arrival window (or the preamble detection window) of the first terminal device can overlap, in time domain, with the preamble arrival window of the second terminal device to the utmost.

In another possible implementation, the second terminal device has a plurality of consecutive random access preamble arrival windows/preamble detection windows, that is, two consecutive random access occasions. A plurality of consecutive random access occasions in this application are two or more consecutive random access occasions.

An application scenario of this embodiment is also a satellite communication scenario shown in FIG. 12. It is assumed that the satellite is in a regenerative mode, an altitude of an orbit in which the satellite is located is 1200 km, a diameter of each beam is 90 km, and a minimum elevation angle of UE in a coverage area of the beam is 10 degrees. The satellite broadcasts the partial common timing advance ΔTA to the UE in the beam/cell. The satellite may calculate the common timing advance of the beam/cell covered by the satellite based on the shortest distance between the satellite and the beam/cell. The common timing advance of the beam/cell may be calculated based on the scenario in FIG. 12, and is 14.67 ms. The following is described by using an example in which the second terminal device has two consecutive random access occasions.

Figure 15:
FIG. 15 is a schematic diagram 3 of time-frequency resource allocation of a random access preamble of a terminal device according to this application.

FIG. 15 is a schematic diagram 3 of time-frequency resource allocation of a random access preamble of a terminal device according to this application. As shown in FIG. 15, it is assumed that the second terminal device has two consecutive random access occasions, and a random access preamble length, a length of a preamble arrival window, or a length of a preamble detection window is 1.8 ms. Therefore, when the first terminal device has two consecutive random access occasions, a total length of two consecutive random access preambles/preamble detection windows of the second terminal device is 3.6 ms. In this application, the two consecutive random access preambles need to be processed as one random access preamble. To be specific, the second random access preamble length d2 in the embodiment shown in FIG. 15 is set to 3.6 ms. The first random access preamble length d1, the length of the preamble arrival window, or the length of preamble detection window of the first terminal device is 3.6 ms. The following allocates time-frequency resources of random access preambles to two types of terminal devices based on the foregoing three-types of restriction conditions in this application.

The reference boundary in an example in FIG. 15 is the start location of the second time unit in which the second random access preamble is located. The first-type restriction condition is used to determine the distance l1 between the start location of the random access preamble of the first terminal device and the reference boundary and the distance l2 between the start location of the random access preamble of the second terminal device and the reference boundary. Because d1=d2, and the difference between d1 and d2 is 0, l1 needs to be equal to l2, to meet the first-type restriction condition. In this application, l1 is set to 4.3 ms, and l2 is set to 4.3 ms. In this way, the condition in which |l2−l1|<=|d2−d1| is met.

In FIG. 15, the period 1 and the period 2 respectively indicate the first period of the first terminal device and the second period of the second terminal device. The period 1 and the period 2 of the two types of terminal devices are determined based on the second-type restriction condition. Therefore, the periods of the random access occasions of the two types of terminal devices are in an integer multiple relationship. In this application, the first period, the period 1, of the random access occasion of the first terminal device is set to 8 ms, and the second period, the period 2, of the random access occasion of the second terminal device is set to 8 ms. In this case, the second-type restriction condition is met.

Finally, the reference common timing used by the system is determined based on the third-type restriction condition, where the reference common timing is an integer multiple of the slot length, the subframe length, or the frame length. In this application, when the reference common timing Tset is set to 12 ms, the satellite broadcasts the partial common timing advance ΔTA, namely 2.67 ms, to the terminal device in the beam/cell.

After the reference common timing is obtained, the first random access parameter and the second random access parameter need to be obtained. The first period and the second period are determined. To be specific, the first period, the period 1, is equal to 8 ms, the second period, the period 2, is equal to 8 ms, and the second duration is equal to l2 and is 4.3 ms. The first duration further needs to be obtained through calculation based on l1.

As shown in FIG. 15, duration of one frame of uplink data is 10 ms, the first random access preamble length d1 is 3.6 ms, and the end location of the first random access preamble is exactly the end location of the frame. Therefore, the first duration between the start location of the first random access preamble and the start location of the first time unit in which the first random access preamble is located is 10 ms−3.6 ms=6.4 ms. The network device sends the first duration and the first period to the first terminal device, and sends the second duration and the second period to the second terminal device.

Based on setting of the foregoing three types of restriction conditions, it can be finally learned from FIG. 15 that the preamble arrival window (or the preamble detection window) of the first terminal device can overlap, in time domain, with the preamble arrival window of the second terminal device to the utmost.

In examples in FIG. 14 and FIG. 15, the example in which the first terminal device is a terminal device with a positioning function and the second terminal device is a terminal device without a positioning function is used for description. However, the first terminal device and the second terminal device are not limited. When values of delay compensation corresponding to random access preambles of any two terminal devices are different, the method in the foregoing embodiments may be applied.

FIG. 14 illustrates a case in which the first terminal device has two consecutive random access preamble arrival windows/preamble detection windows, and FIG. 15 illustrates a case in which the second terminal device has two consecutive random access preamble arrival windows/preamble detection windows. It may be understood that when the first terminal device has more than two consecutive random access preamble arrival windows/preamble detection windows, or the second terminal device has more than two consecutive random access preamble arrival windows/preamble detection windows, or when both the first terminal device and the second terminal device have two or more consecutive random access preamble arrival windows/preamble detection windows, the method in the foregoing embodiments may also be applied. For specific implementation, refer to the foregoing embodiments. Details are not described herein again.

In the random access method according to this application, the network device first determines the first random access preamble length of the first terminal device and the second random access preamble length of the second terminal device based on the relative location between the beam coverage or the cell and the satellite. Then, the network device determines the first random access parameter of the first terminal device and the second random access parameter of the second terminal device based on the first random access preamble length and the second random access preamble length. Finally, the network device sends the first random access parameter to the first terminal device and sends the second random access parameter to the second terminal device. Therefore, the first terminal device performs random access based on the first random access parameter, and the second terminal device performs random access based on the second random access parameter. Because there is the overlapping part between the access preamble indicated by the first random access parameter and the access preamble indicated by the second random access parameter, uplink time-frequency resources occupied by the preamble can be reduced, interference caused by the preamble to the uplink data can be reduced, and time-frequency resource waste is reduced. The overlapping area between the random access preamble of the first terminal device and the random access preamble of the second terminal device is maximized by using the first-type restriction condition, that is, the absolute value between the first duration and the third duration is less than or equal to the absolute value of the difference between the first random access preamble length and the second random access preamble length. The quantity of overlapping resources between the random access preamble of the first terminal device and the random access preamble of the second terminal device is maximized by using the second-type restriction condition, that is, the first period is an integer multiple of the second period, or the second period is an integer multiple of the first period. The uplink data of the second terminal device is aligned with the timing boundary of the downlink data on the network device side by using the third-type restriction condition, that is, the reference common timing is an integer multiple of the slot. When the foregoing three types of restriction conditions are met, the random access preamble of the first terminal device may overlap with the random access preamble of the second terminal device to the utmost. This minimizes time-frequency resources occupied by the random access preamble of the terminal device, and interference caused by the random access preamble of the terminal device to uplink data of another terminal device, ensures that a total quantity of time-frequency resources occupied by the random access preamble of the first terminal device and the random access preamble of the second terminal device is minimized, and saves time-frequency resources to the utmost.

Figure 16:
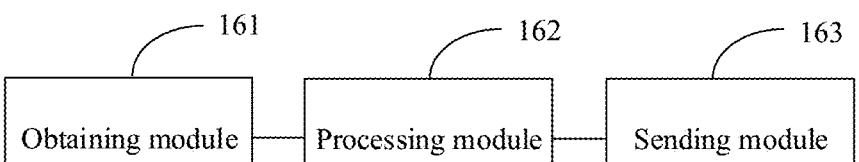
FIG. 16 is a schematic diagram of a structure of a random access apparatus according to this application.

FIG. 16 is a schematic diagram of a structure of a random access apparatus according to this application. As shown in FIG. 16, the random access apparatus includes an obtaining module 161, a processing module 162, and a sending module 163.

The obtaining module 161 is configured to obtain a first random access preamble length and a second random access preamble length, where the first random access preamble length is duration of a first random access preamble sent by a first terminal device, the second random access preamble length is duration of a second random access preamble sent by a second terminal device, and a value of delay compensation performed by a network device when receiving the first random access preamble is different from a value of delay compensation performed by the network device when receiving the second random access preamble.

The processing module 162 is configured to determine a first random access parameter of the first terminal device and a second random access parameter of the second terminal device based on the first random access preamble length and the second random access preamble length, where there is an overlapping part, in time domain, between a random access preamble indicated by the first random access parameter and a random access preamble indicated by the second random access parameter.

The sending module 163 is configured to send the first random access parameter to the first terminal device, and send the second random access parameter to the second terminal device.

In a possible implementation, the first random access parameter includes at least one of the following parameters:

first duration of an interval between a start location of the first random access preamble and a start location of a first time unit in which the first random access preamble is located, and a first period of the first random access preamble.

The second random access parameter includes at least one of the following parameters:

second duration of an interval between a start location of the second random access preamble and a start location of a second time unit in which the second random access preamble is located, and a second period of the second random access preamble.

In a possible implementation, an absolute value of a difference between the first duration and third duration is less than or equal to an absolute value of a difference between the first random access preamble length and the second random access preamble length, and the third duration is duration of an interval between the start location of the second random access preamble received by the network device and the start location of the first time unit in which the first random access preamble is located.

In a possible implementation, duration of the second period is M times duration of the first period, and M is a positive integer.

Alternatively, duration of the first period is N times duration of the second period, and N is a positive integer.

In a possible implementation, a reference common timing is an integer multiple of a third time unit, and the reference common timing is a value of delay compensation performed by the network device on the second terminal device for sending the second random access preamble.

The random access apparatus in this embodiment may be configured to execute the foregoing method embodiments. Implementation principles and technical effects are similar, and details are not described in this embodiment again.

Optionally, during hardware implementation, the processing module in this embodiment may be integrated into a processor for implementation, the sending module may be integrated into a transmitter for implementation, and the obtaining module may be integrated into a receiver for implementation.

Figure 17:
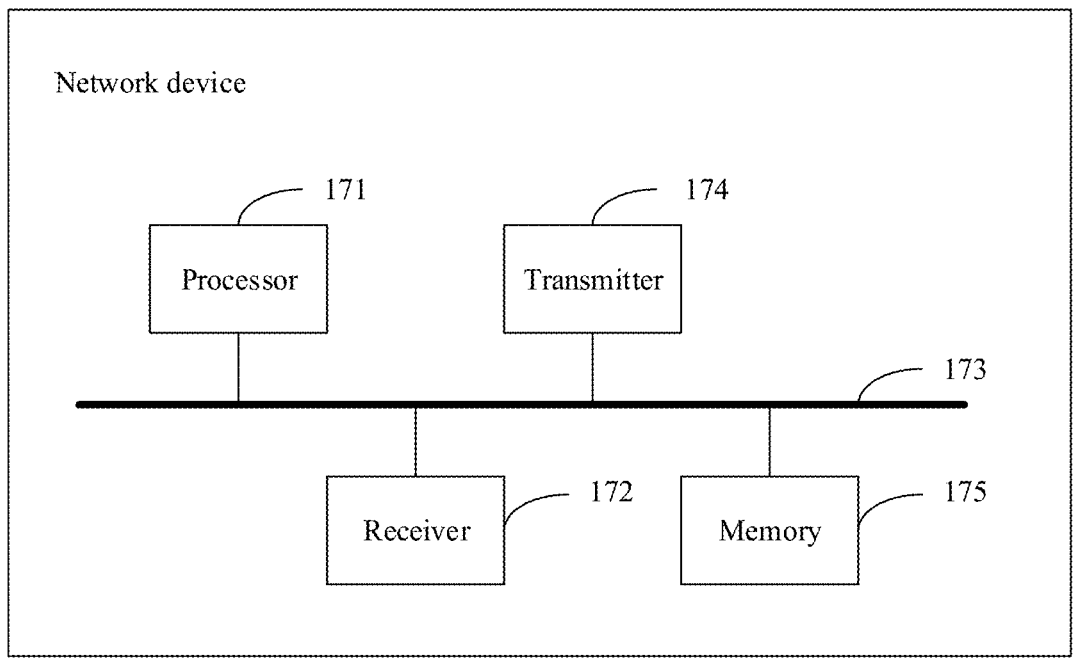
FIG. 17 is a schematic diagram of a hardware structure of a network device according to this application.

FIG. 17 is a schematic diagram of a hardware structure of a network device according to this application. The network device in this embodiment includes a processor 171 and a memory 175.

The memory 175 is configured to store a computer program.

The processor 171 is configured to execute the computer program stored in the memory, to implement steps performed by the network device in the foregoing method embodiments. For details, refer to related description in the foregoing method embodiments.

Optionally, the memory 175 may be independent of the processor 171 or independent of the network device, or may be in the processor 171 or in the network device. The memory 175 may be a physically independent unit, storage space or a network disk on a cloud server, or the like.

When the memory 175 is a device independent of the processor 171, the network device may further include a bus 173, configured to connect the memory 175 to the processor 171.

The bus 173 may be an industry standard architecture (Industry Standard Architecture, ISA) bus, a peripheral component interconnect (Peripheral Component Interconnect, PCI) bus, an extended industry standard architecture (Extended Industry Standard Architecture, EISA) bus, or the like. Buses may be classified into an address bus, a data bus, a control bus, and the like. For ease of representation, the bus in the accompanying drawings of this application is not limited to only one bus or only one type of bus.

The network device shown in FIG. 17 may further include a receiver 172 and a transmitter 174, configured to receive and send data. The receiver 172 is configured to receive a first random access preamble and a second random access preamble. The transmitter 174 is configured to send a first random access parameter to a first terminal device, send a second random access parameter to a second terminal device, and the like.

In addition, the processor 171 may be a central processing unit, a general-purpose processor, a digital signal processor (English: Digital Signal Processor, DSP for short), an application-specific integrated circuit (English: Application-Specific Integrated Circuit, ASIC for short), a field programmable gate array or another programmable logic component, a transistor logic device, a hardware component, or any combination thereof. The general-purpose processor may be a microprocessor, or the processor may be any conventional processor or the like. The steps of the method disclosed with reference to this application may be directly implemented by a hardware processor, or may be implemented by a combination of hardware and a software module in a processor. The processor may implement or execute various example logical blocks, modules, and circuits described with reference to content disclosed in this application.

Alternatively, the processor may be a combination of processors implementing a computing function, for example, a combination of one or more microprocessors, or a combination of the digital signal processor and a microprocessor. In addition, the memory 175 may include a volatile memory (volatile memory), for example, a random access memory (random access memory, RAM). Alternatively, the memory may include a non-volatile memory (non-volatile memory), for example, a flash memory (flash memory), a hard disk drive (hard disk drive, HDD), a solid-state drive (solid-state drive, SSD), a cloud storage (cloud storage), a network attached storage (network attached storage, NAS), or a network drive (network drive). Alternatively, the memory may further include a combination of the foregoing types of memories or another medium or product with a storage function in any form.

The network device in this embodiment may be configured to perform the method performed by the network device in the foregoing embodiments. Implementation principles and technical effects are similar, and details are not described in this embodiment again.

This application further provides a storage medium, where the storage medium includes a computer program, and the computer program is used to implement the method in the foregoing possible implementations.

This application further provides a computer program product. The computer program product includes computer program code. When the computer program code is run on a computer, the computer is enabled to perform the method in the foregoing possible implementations.

This application further provides a chip, including a memory and a processor, where the memory is configured to store a computer program, and the processor is configured to invoke the computer program from the memory and run the computer program, so that a communication device on which the chip is installed performs the method in the foregoing possible implementations.

This application further provides a random access system, where the random access system includes a first terminal device, a second terminal device, and a network device, the first terminal device and the second terminal device are two terminal devices whose values of delay compensation performed by the network device when receiving random access preambles are different, and the network device is the network device in the embodiment and the possible implementations shown in FIG. 16.

In the several embodiments provided in this application, it should be understood that the disclosed device and method may be implemented in other manners. For example, the described device embodiment is merely an example. For example, module division is merely logical function division and may be other division during actual implementation. For example, a plurality of modules may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical units, may be located in one position, or may be distributed on a plurality of network units. Some or all the modules may be selected based on an actual requirement to achieve objectives of the solutions of the embodiments.

In addition, functional modules in the embodiments of this application may be integrated into one processing unit, or each of the modules may exist alone physically, or two or more modules are integrated into one unit. The integrated unit may be implemented in a form of hardware, or may be implemented in a form of hardware in addition to a software functional unit.

When the foregoing integrated module is implemented in a form of a software functional module, the integrated unit may be stored in a computer-readable storage medium. The software functional module is stored in a storage medium and includes several instructions for instructing a computer device (which may be a personal computer, a server, or a network device) or a processor (processor) to perform some of the steps of the methods described in the embodiments of this application.

The storage medium may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc. The storage medium may be any available medium accessible to a general-purpose computer or a special-purpose computer.

For example, a storage medium is coupled to a processor, so that the processor can read information from the storage medium or write information into the storage medium. It is clear that the storage medium may be a component of the processor. The processor and the storage medium may be located in an application-specific integrated circuit (Application-Specific Integrated Circuits, ASIC for short). It is clear that the processor and the storage medium may alternatively exist in the device as discrete components.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of this application.

What is claimed is:

1. A random access method, the random access method comprising:
   obtaining, by a network device, a first random access preamble length and a second random access preamble length, wherein the first random access preamble length is a duration of a first random access preamble sent by a first terminal device, the second random access preamble length is a duration of a second random access preamble sent by a second terminal device, and a value of a delay compensation performed by the network device when receiving the first random access preamble is different from a value of a delay compensation performed by the network device when receiving the second random access preamble;

determining, by the network device, a first random access parameter of the first terminal device and a second random access parameter of the second terminal device based on the first random access preamble length and the second random access preamble length, wherein there is an overlapping part, in time domain, between the first random access preamble indicated by the first random access parameter and the second random access preamble indicated by the second random access parameter; and sending, by the network device, the first random access parameter to the first terminal device, and sending the second random access parameter to the second terminal device.

2. The random access method according to claim 1, wherein:
the first random access parameter comprises at least one of the following parameters:
a first duration of an interval between a start location of the first random access preamble and a start location of a first time unit in which the first random access preamble is located; or
a first period of the first random access preamble; and
the second random access parameter comprises at least one of the following parameters:
a second duration of an interval between a start location of the second random access preamble and a start location of a second time unit in which the second random access preamble is located; or
a second period of the second random access preamble.

3. The random access method according to claim 2, wherein:
an absolute value of a difference between the first duration and a third duration is less than or equal to an absolute value of a difference between the first random access preamble length and the second random access preamble length, and
the third duration is duration of an interval between the start location of the second random access preamble received by the network device and the start location of the first time unit in which the first random access preamble is located.

4. The random access method according to claim 2, wherein;
a duration of the second period is M times a duration of the first period, and M is a positive integer; or
a duration of the first period is N times a duration of the second period, and N is a positive integer.

5. The random access method according to claim 2, wherein:
a reference common timing is an integer multiple of a third time unit, and
the reference common timing is a value of a delay compensation performed by the network device on the second terminal device for sending the second random access preamble.

6. A random access apparatus, the random access apparatus comprising:
at least one processor; and
one or more memories coupled to the at least one processor and storing program instructions for execution by the at least one processor to:
obtain a first random access preamble length and a second random access preamble length, wherein the first random access preamble length is a duration of a first random access preamble sent by a first terminal device, the second random access preamble length is a duration of a second random access preamble sent by a second terminal device, and a value of a delay compensation performed by a network device when receiving the first random access preamble is different from a value of a delay compensation performed by the network device when receiving the second random access preamble;
determine a first random access parameter of the first terminal device and a second random access parameter of the second terminal device based on the first random access preamble length and the second random access preamble length, wherein there is an overlapping part, in time domain, between the first random access preamble indicated by the first random access parameter and the second random access preamble indicated by the second random access parameter; and
send the first random access parameter to the first terminal device, and send the second random access parameter to the second terminal device.

7. The random access apparatus according to claim 6, wherein:
the first random access parameter comprises at least one of the following parameters:
a first duration of an interval between a start location of the first random access preamble and a start location of a first time unit in which the first random access preamble is located; or
a first period of the first random access preamble; and
the second random access parameter comprises at least one of the following parameters:
a second duration of an interval between a start location of the second random access preamble and a start location of a second time unit in which the second random access preamble is located; or
a second period of the second random access preamble.

8. The random access apparatus according to claim 7, wherein an absolute value of a difference between the first duration and a third duration is less than or equal to an absolute value of a difference between the first random access preamble length and the second random access preamble length, and the third duration is duration of an interval between the start location of the second random access preamble received by the network device and the start location of the first time unit in which the first random access preamble is located.

9. The random access apparatus according to claim 7, wherein:
a duration of the second period is M times a duration of the first period, and M is a positive integer; or
a duration of the first period is N times a duration of the second period, and N is a positive integer.

10. The random access apparatus according to claim 7, wherein:
a reference common timing is an integer multiple of a third time unit, and
the reference common timing is a value of a delay compensation performed by the network device on the second terminal device for sending the second random access preamble.

11. A non-transitory computer readable storage medium, wherein the non-transitory computer readable storage medium stores program instructions for execution by at least one processor to:
obtain a first random access preamble length and a second random access preamble length, wherein the first random access preamble length is a duration of a first random access preamble sent by a first terminal device, the second random access preamble length is a duration of a second random access preamble sent by a second terminal device, and a value of a delay compensation performed by a network device when receiving the first random access preamble is different from a value of a delay compensation performed by the network device when receiving the second random access preamble;

determine a first random access parameter of the first terminal device and a second random access parameter of the second terminal device based on the first random access preamble length and the second random access preamble length, wherein there is an overlapping part, in time domain, between the first random access preamble indicated by the first random access parameter and the second random access preamble indicated by the second random access parameter; and send the first random access parameter to the first terminal device, and send the second random access parameter to the second terminal device.

12. The non-transitory computer readable storage medium according to claim 11, wherein:

the first random access parameter comprises at least one of the following parameters:
   a first duration of an interval between a start location of the first random access preamble and a start location of a first time unit in which the first random access preamble is located; or
   a first period of the first random access preamble; and the second random access parameter comprises at least one of the following parameters:
   a second duration of an interval between a start location of the second random access preamble and a start location of a second time unit in which the second random access preamble is located; or
   a second period of the second random access preamble.

13. The non-transitory computer readable storage medium according to claim 12, wherein:

an absolute value of a difference between the first duration and a third duration is less than or equal to an absolute value of a difference between the first random access preamble length and the second random access preamble length, and the third duration is duration of an interval between the start location of the second random access preamble received by the network device and the start location of the first time unit in which the first random access preamble is located.

14. The non-transitory computer readable storage medium according to claim 12, wherein:

a duration of the second period is M times a duration of the first period, and M is a positive integer; or a duration of the first period is N times a duration of the second period, and N is a positive integer.

15. The non-transitory computer readable storage medium according to claim 12, wherein:

a reference common timing is an integer multiple of a third time unit, and the reference common timing is a value of a delay compensation performed by the network device on the second terminal device for sending the second random access preamble.

* * * * *

UNITED STATES PATENT AND TRADEMARK OFFICE
CERTIFICATE OF CORRECTION

PATENT NO. : 12,120,731 B2  
APPLICATION NO. : 17/735601  
DATED : October 15, 2024  
INVENTOR(S) : Xiaolu Wang et al.

Page 1 of 1

It is certified that error appears in the above-identified patent and that said Letters Patent is hereby corrected as shown below:

In the Claims

In Column 31, In Line 44, In Claim 4, delete "wherein;" and insert -- wherein: --.

Signed and Sealed this  
Eleventh Day of February, 2025

Coke Morgan Stewart  
*Acting Director of the United States Patent and Trademark Office*